US012761962B1

(12) United States Patent
Heil

(10) Patent No.: US 12,761,962 B1
(45) Date of Patent: Oct. 13, 2026

(54) DISPATCH ENGINE PROCESSING MULTIPLE TASK TYPES FOR EFFICIENT DISPATCH OF EXECUTION OF TRANSFORMER WORKLOADS ON AI COMPUTE ACCELERATOR

(71) Applicant: d-MATRIX CORPORATION, Santa Clara, CA (US)

(72) Inventor: Timothy Heil, Santa Clara, CA (US)

(73) Assignee: d-MATRIX CORPORATION, Santa Clara, CA (US)

( * ) Notice: Subject to any disclaimer, the term of this patent is extended or adjusted under 35 U.S.C. 154(b) by 62 days.

(21) Appl. No.: 18/939,992

(22) Filed: Nov. 7, 2024

(51) Int. Cl.

| | |
|---|---|
| ***G06F 9/50*** | (2006.01) |
| ***G06F 9/48*** | (2006.01) |
| ***G06F 9/54*** | (2006.01) |
| ***G06F 13/40*** | (2006.01) |

(52) U.S. Cl.
CPC .......... *G06F 9/5027* (2013.01); *G06F 9/4843* (2013.01); *G06F 9/54* (2013.01); *G06F 13/409* (2013.01); *G06F 2209/543* (2013.01); *G06F 2213/0026* (2013.01)

(58) Field of Classification Search
CPC ............................ G06F 9/4843; G06F 9/5027
See application file for complete search history.

(56) References Cited

U.S. PATENT DOCUMENTS

2022/0291955 A1* 9/2022 Mrozek .................... H04L 1/18
2023/0058355 A1 2/2023 Hornung et al.
2023/0195471 A1* 6/2023 Millar .................. G06F 8/4441 712/22
2023/0204662 A1* 6/2023 Margulis .......... G01R 31/31723 714/735
2024/0272941 A1* 8/2024 Dragojevic ............. G06F 9/544
2024/0273666 A1* 8/2024 Fishwick .................. G06T 1/20
2024/0419844 A1* 12/2024 Sood ..................... G06F 21/606
2026/0056784 A1* 2/2026 Li ......................... G06F 9/5016

* cited by examiner

*Primary Examiner* — Michael J Metzger
(74) *Attorney, Agent, or Firm* — Ogawa P.C.

(57) ABSTRACT

An AI accelerator comprises a plurality of chiplets and a dispatch engine integrated circuit, is configurable to efficiently process AI computational workloads (e.g., transformer operations). The dispatch engine includes a task fetch engine and a plurality of task pipelines coupled thereto. Each task pipeline comprises a task queue, tasks coupled to the task queue, and a task dispatch engine coupled to the tasks and configured to dispatch one or more of the tasks. Three task types are used: instruction tasks, wait tasks, and completion tasks. An instruction dispatch engine coupled to the task dispatch engine is configured to receive and dispatch an instruction task to one or more compute units. A memory device coupled to the instruction dispatch engine stores one or more instructions. An instruction fetch engine is coupled to the memory device and configured to transfer one or more instructions from an external memory to the memory device.

17 Claims, 16 Drawing Sheets

DISPATCH ENGINE PROCESSING MULTIPLE TASK TYPES FOR EFFICIENT DISPATCH OF EXECUTION OF TRANSFORMER WORKLOADS ON AI COMPUTE ACCELERATOR

BACKGROUND OF THE INVENTION

The present invention relates generally to integrated circuit (IC) devices and artificial intelligence (AI). More specifically, the present invention relates to methods and device structures for accelerating computing workloads, such as those in transformer-based models (a.k.a. transformers).

The transformer has been the dominant neural network architecture in the natural language processing (NLP) field, and its use continues to expand into other machine learning applications. The original Transformer was introduced in the paper "Attention is all you need" (Vaswani et al., 2017), which sparked the development of many transformer model variations, such as the generative pre-trained transformer (GPT) and the bidirectional encoder representations from transformers (BERT) models. Such transformers have significantly outperformed other models in inference tasks by their use of a self-attention mechanism that avoids recursion and allows for easy parallelism. On the other hand, the transformer workloads are very computationally intensive and have high memory requirements, and have been plagued as being time-intensive and inefficient.

Most recently, NLP models have grown by a thousand times in both model size and compute requirements. For example, it can take about 4 months for 1024 graphics processing units (GPUs) to train a model like GPT-3 with 175 billion parameters. New NLP models having a trillion parameters are already being developed, and multi-trillion parameter models are on the horizon. Such rapid growth has made it increasingly difficult to serve NLP models at scale.

From the above, it can be seen that improved devices and methods to accelerate compute workloads for AI are highly desirable.

BRIEF SUMMARY OF THE INVENTION

The present invention relates generally to integrated circuit (IC) devices and artificial intelligence (AI) systems. More particularly, the present invention relates to methods and device structures for accelerating computing workloads, such as those in transformer-based neural network models (a.k.a. transformers) and the like. These methods and structures can be used in machine/deep learning applications such as natural language processing (NLP), computer vision (CV), and the like. Merely by way of example, the invention has been applied to AI accelerator apparatuses and chiplet devices configured in a PCIe card.

According to an example, the present invention provides for a dispatch engine (DE) apparatus using a hardware and software co-designed structure for efficient distributed control over the execution of AI-related workloads in an AI accelerator apparatus. To address the overheads of the control plane in such AI systems, a dispatch engine (DE) apparatus can be configured to store a compute workload having groups of tasks in the form of a hierarchy of serial and/or concurrent queues in a task queue. Also, the DE apparatus can use various hardware modules to asynchronously delegate the tasks to various resources or destination devices and to track the completion of such tasks and task groups in an efficient manner.

In an example, the present invention provides a DE apparatus configured as an IC for an AI accelerator IC. The apparatus can include a task queue module having plurality of rows, numbered from 1 to N (e.g., N>4), and a plurality of columns, numbered from 1 to M (e.g., M>4), and a plurality of cells. Each of the plurality of cells is defined by one of the rows and one of the columns. The task queue module can be configured to receive one or more tasks. The task queue module can be configured to store each of the plurality tasks in one of the plurality of cells such that the work units are stored according to queues.

The DE apparatus can also include an interrupt/completion handler module, a resource monitor module, and a task dispatcher module configured with the task queue module to track and dispatch work units that are sent to various destination devices for processing. The resource monitor can be coupled to each of the plurality of cells in the task queue module, and can be configured to monitor a state of each of the plurality of destination devices. Further, the task dispatcher module can be coupled to each of the plurality of cells in the task queue module, and can be configured to asynchronously dispatch the work unit stored in each of the plurality of cells to one of the plurality of destination devices in a parallel pipeline process using a bus device coupled to the task queue module such that each cell is configured to communicate through the bus device to one of the plurality of compute units.

In certain embodiments, a DE may include a task fetch engine and a plurality of task pipelines coupled thereto. Each task pipeline comprises a task queue, tasks coupled to the task queue, and a task dispatch engine coupled to the tasks and configured to dispatch one or more of the tasks. Three different types of tasks may be used: instruction tasks, wait tasks, and completion tasks. An instruction dispatch engine coupled to the task dispatch engine is configured to receive and dispatch an instruction task to one or more compute units. A memory device coupled to the instruction dispatch engine stores one or more instructions. An instruction fetch engine is coupled to the memory device and configured to transfer one or more instructions from an external memory to the memory device. Wait tasks pause processing and support multiple wait counts for non-deterministic graph support. Completion tasks indicate task completion and support dispatch dependencies and non-deterministic graphs.

The DE architecture and its related methods can provide many benefits. The hierarchy of queues scheme provides a unique data structure to store AI workloads in a self-updating manner. Also, the hardware units of the DE apparatus allow the stored AI workloads to be autonomously and asynchronously dispatched to be executed at destination devices. Using multiple work descriptors/control sets, a processing unit (e.g., CPU) configured with the DE apparatus can create work ahead-of-time and group work items such that the most critical resources are efficiently utilized. Further, these benefits can be realized in IC chips and chiplet devices with minimal added cost of silicon area.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), and the like. Merely by way of example, the invention has been applied to AI accelerator apparatuses and chiplet devices configured to perform high throughput operations for NLP.

Currently, the vast majority of NLP models are based on the transformer model, such as the bidirectional encoder representations from transformers (BERT) model, BERT Large model, and generative pre-trained transformer (GPT) models such as GPT-2 and GPT-3, etc. However, these transformers have very high compute and memory requirements. According to an example, the present invention provides for an apparatus using chiplet devices that are configured to accelerate transformer computations for AI applications. Examples of the AI accelerator apparatus are shown in FIGS. 1A and 1B.

Figure 1A:
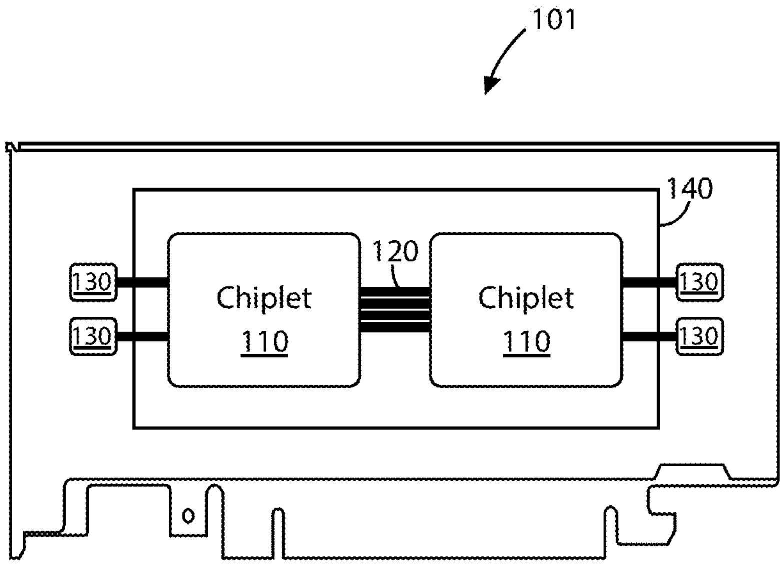
FIG. 1A-1B are simplified block diagrams illustrating AI accelerator apparatuses according to examples of the present invention.

FIG. 1A illustrates a simplified AI accelerator apparatus 101 with two chiplet devices 110. As shown, the chiplet devices 110 are coupled to each other by one or more die-to-die (D2D) interconnects 120. Also, each chiplet device 110 is coupled to a memory interface 130 (e.g., static random access memory (SRAM), dynamic random access memory (DRAM), synchronous dynamic RAM (SDRAM), or the like). The apparatus 101 also includes a substrate member 140 that provides mechanical support to the chiplet devices 110 that are configured upon a surface region of the substrate member 140. The substrate can include interposers, such as a silicon interposer, glass interposer, organic interposer, or the like. The chiplets can be coupled to one or more interposers, which can be configured to enable communication between the chiplets and other components (e.g., serving as a bridge or conduit that allows electrical signals to pass between internal and external elements).

Figure 1B:
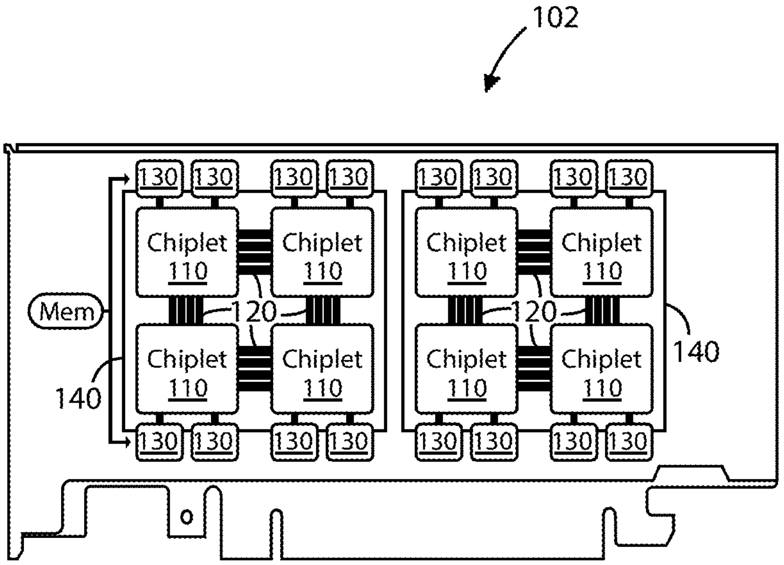

FIG. 1B illustrates a simplified AI accelerator apparatus 102 with eight chiplet devices 110 configured in two groups of four chiplets on the substrate member 140. Here, each chiplet device 110 within a group is coupled to other chiplet devices by one or more D2D interconnects 120. Apparatus 102 also shows a DRAM memory interface 130 coupled to each of the chiplet devices 110. The DRAM memory interface 130 can be coupled to one or more memory modules, represented by the "Mem" block.

As shown, the AI accelerator apparatuses 101 and 102 are embodied in peripheral component interconnect express (PCIe) card form factors, but the AI accelerator apparatus can be configured in other form factors as well. These PCIe card form factors can be configured in a variety of dimensions (e.g., full height, full length (FHFL); half height, half length (HHHL), etc.) and mechanical sizes (e.g., 1×, 2×, 4×, 16×, etc.). In an example, one or more substrate members 140, each having one or more chiplets, are coupled to a PCIe card. Those of ordinary skill in the art will recognize other variations, modifications, and alternatives to these elements and configurations of the AI accelerator apparatus.

Embodiments of the AI accelerator apparatus can implement several techniques to improve performance (e.g., computational efficiency) in various AI applications. The AI accelerator apparatus can include digital in-memory-compute (DIMC) to integrate computational functions and memory fabric. Algorithms for the mapper, numerics, and sparsity can be optimized within the compute fabric. And, use of chiplets and interconnects configured on organic interposers can provide modularity and scalability.

According to an example, the present invention implements chiplets with in-memory-compute (IMC) functionality, which can be used to accelerate the computations required by the workloads of transformers. The computations for training these models can include performing a scaled dot-product attention function to determine a probability distribution associated with a desired result in a particular AI application. In the case of training NLP models, the desired result can include predicting subsequent words, determining contextual word meaning, translating to another language, etc.

The chiplet architecture can include a plurality of slice devices (or slices) controlled by a central processing unit (CPU) to perform the transformer computations in parallel. Each slice is a modular IC device that can process a portion of these computations. The plurality of slices can be divided into tiles/gangs (i.e., subsets) of one or more slices with a CPU coupled to each of the slices within the tile. This tile CPU can be configured to perform transformer computations in parallel via each of the slices within the tile. A global CPU can be coupled to each of these tile CPUs and be configured to perform transformer computations in parallel via all of the slices in one or more chiplets using the tile CPUs. Further details of the chiplets are discussed in reference to FIGS. 2A-5B, while transformers are discussed in reference to FIGS. 6-9.

Figure 2A:
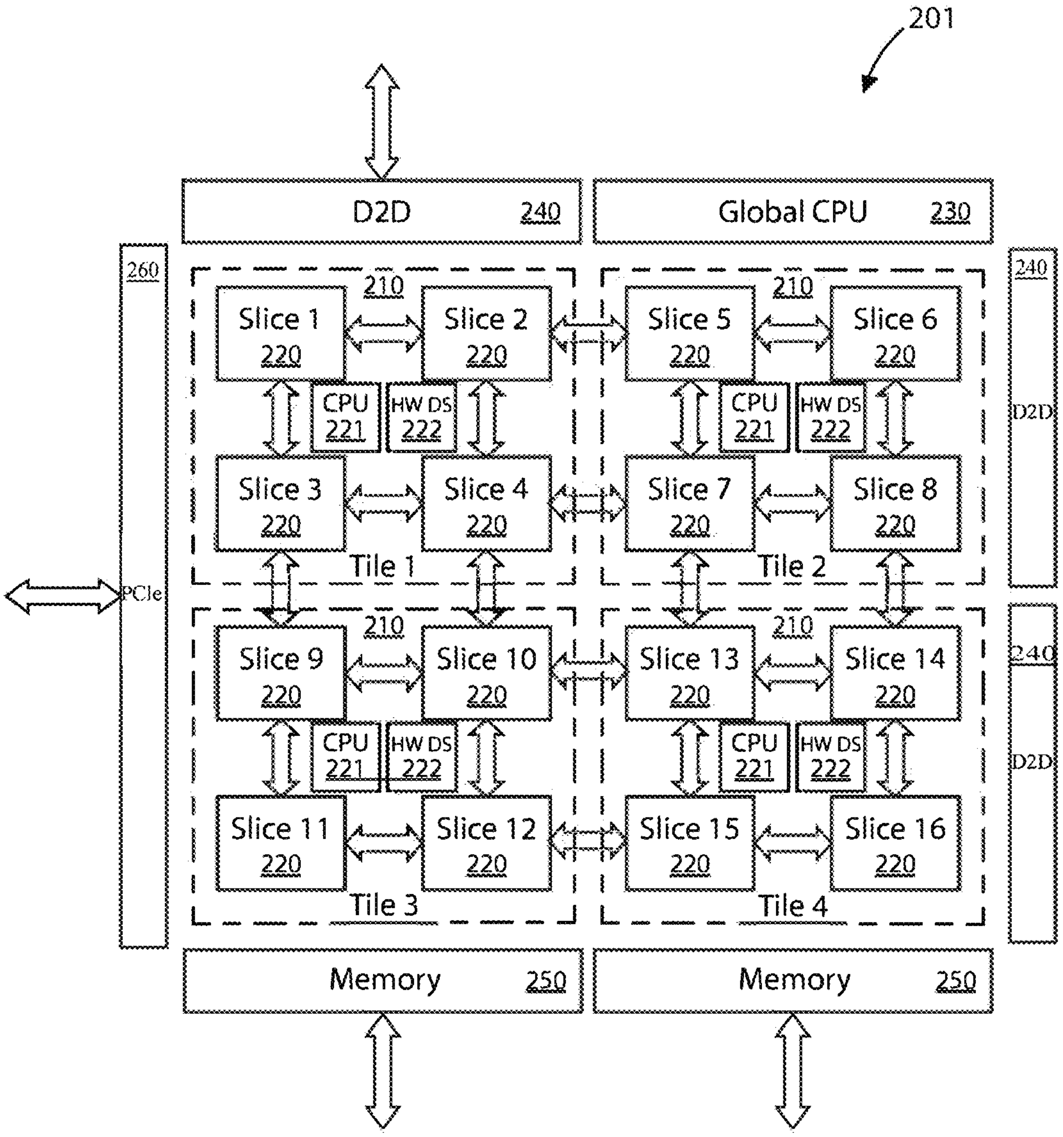
FIGS. 2A-2B are simplified block diagrams illustrating 16-slice chiplet devices according to examples of the present invention.

FIG. 2A is a simplified block diagram illustrating an example configuration of a 16-slice chiplet device 201. In this case, the chiplet 201 includes four tile devices 210, each of which includes four slice devices 220, a CPU 221, and a hardware dispatch (HW DS) device 222. In a specific example, these tiles 210 are arranged in a symmetrical manner. As discussed previously, the CPU 221 of a tile 210 can coordinate the operations performed by all slices within the tile. The HW DS 222 is coupled to the CPU 221 and can be configured to coordinate control of the slices 220 in the tile 210 (e.g., to determine which slice in the tile processes a target portion of transformer computations). In a specific example, the CPU 221 can be a reduced instruction set computer (RISC) CPU, or the like. Further, the CPU 221 can be coupled to a dispatch engine, which is configured to coordinate control of the CPU 221 (e.g., to determine which portions of transformer computations are processed by the particular CPU).

The CPUs 221 of each tile 210 can be coupled to a global CPU via a global CPU interface 230 (e.g., buses, connectors, sockets, etc.). This global CPU can be configured to coordinate the processing of all chiplet devices in an AI accelerator apparatus, such as apparatuses 101 and 102 of FIGS. 1A and 1B, respectively. In an example, a global CPU can use the HW DS 222 of each tile to direct each associated CPU 221 to perform various portions of the transformer computations across the slices in the tile. Also, the global CPU can be a RISC processor, or the like. The chiplet 201 also includes D2D interconnects 240 and a memory interface 250, both of which are coupled to each of the CPUs 221 in each of the tiles. In an example, the D2D interconnects can be configured with single-ended signaling. The memory interface 250 can include one or more memory buses coupled to one or more memory devices (e.g., DRAM, SRAM, SDRAM, or the like).

Further, the chiplet 201 includes a PCIe interface/bus 260 coupled to each of the CPUs 221 in each of the tiles. The PCIe interface 260 can be configured to communicate with a server or other communication system. In the case of a plurality of chiplet devices, a main bus device is coupled to the PCIe bus 260 of each chiplet device using a master chiplet device (e.g., main bus device also coupled to the master chiplet device). This master chiplet device is coupled to each other chiplet device using at least the D2D interconnects 240. The master chiplet device and the main bus device can be configured overlying a substrate member (e.g., same substrate as chiplets or separate substrate). An apparatus integrating one or more chiplets can also be coupled to a power source (e.g., configured on-chip, configured in a system, or coupled externally) and can be configured and operable to a server, network switch, or host system using the main bus device. The server apparatus can also be one of a plurality of server apparatuses configured for a server farm within a data center, or other similar configuration.

In a specific example, an AI accelerator apparatus configured for GPT-3 can incorporate eight chiplets (similar to apparatus 102 of FIG. 1B). The chiplets can be configured with D2D 16×16 Gb/s interconnects, 32-bit LPDDR5 6.4 Gb/s memory modules, and 16 lane PCIe Gen 5 PHY NRZ 32 Gb/s/lane interface. LPDDR5 (16×16 GB) can provide the necessary capacity, bandwidth and low power for large scale NLP models, such as quantized GPT-3. Of course, there can be other variations, modifications, and alternatives.

Figure 2B:
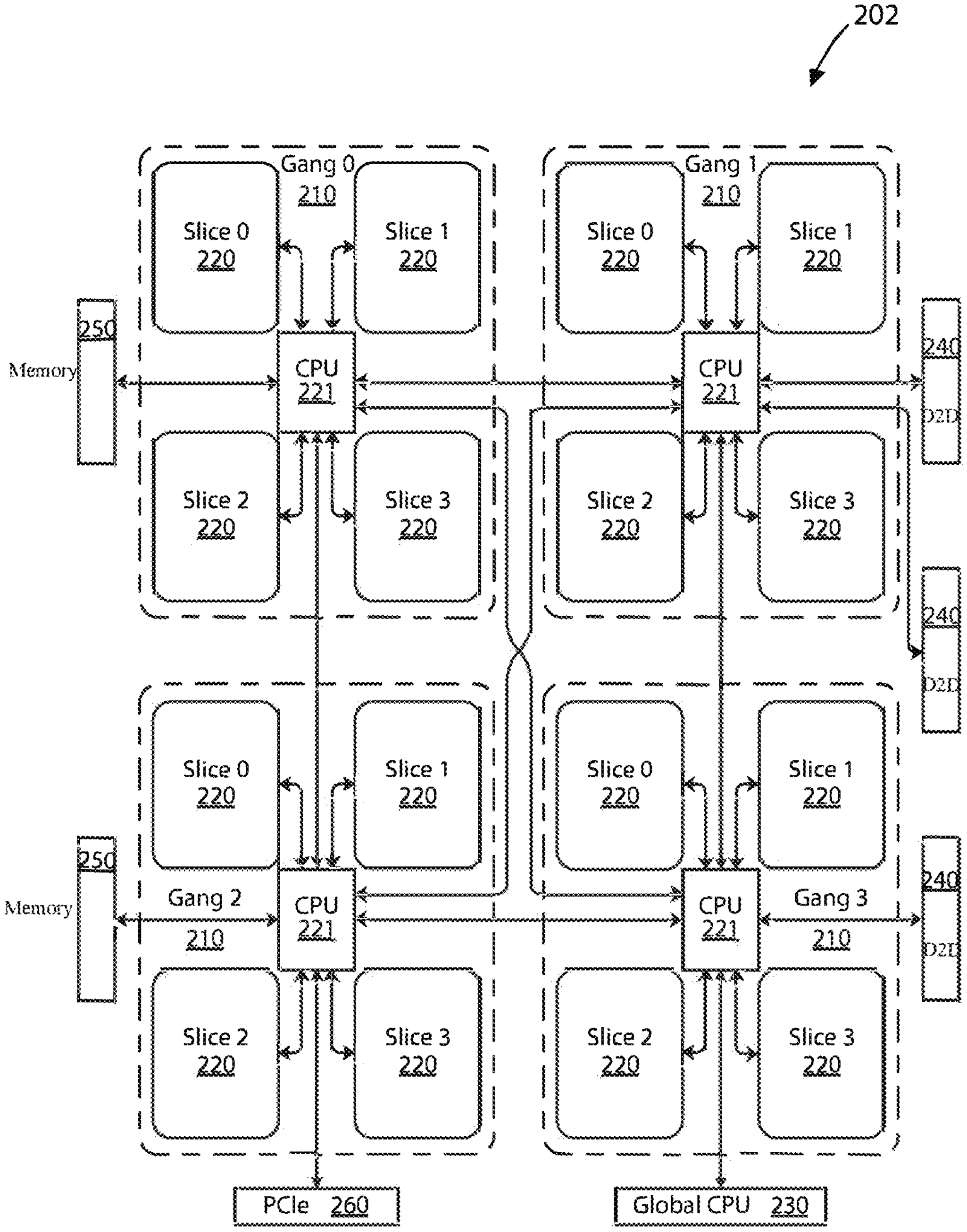

FIG. 2B is a simplified block diagram illustrating an example configuration of a 16-slice chiplet device 202. Similar to chiplet 201, chiplet 202 includes four gangs 210 (or tiles), each of which includes four slice devices 220 and a CPU 221. As shown, the CPU 221 of each gang/tile 210 is coupled to each of the slices 220 and to each other CPU 221 of the other gangs/tiles 210. In an example, the tiles/gangs serve as neural cores, and the slices serve as compute cores. With this multi-core configuration, the chiplet device can be configured to take and run several computations in parallel. The CPUs 221 are also coupled to a global CPU interface 230, D2D interconnects 240, a memory interface 250, and a PCIe interface 260. As described for FIG. 2A, the global CPU interface 230 connects to a global CPU that controls all of the CPUs 221 of each gang 210.

Figure 3A:
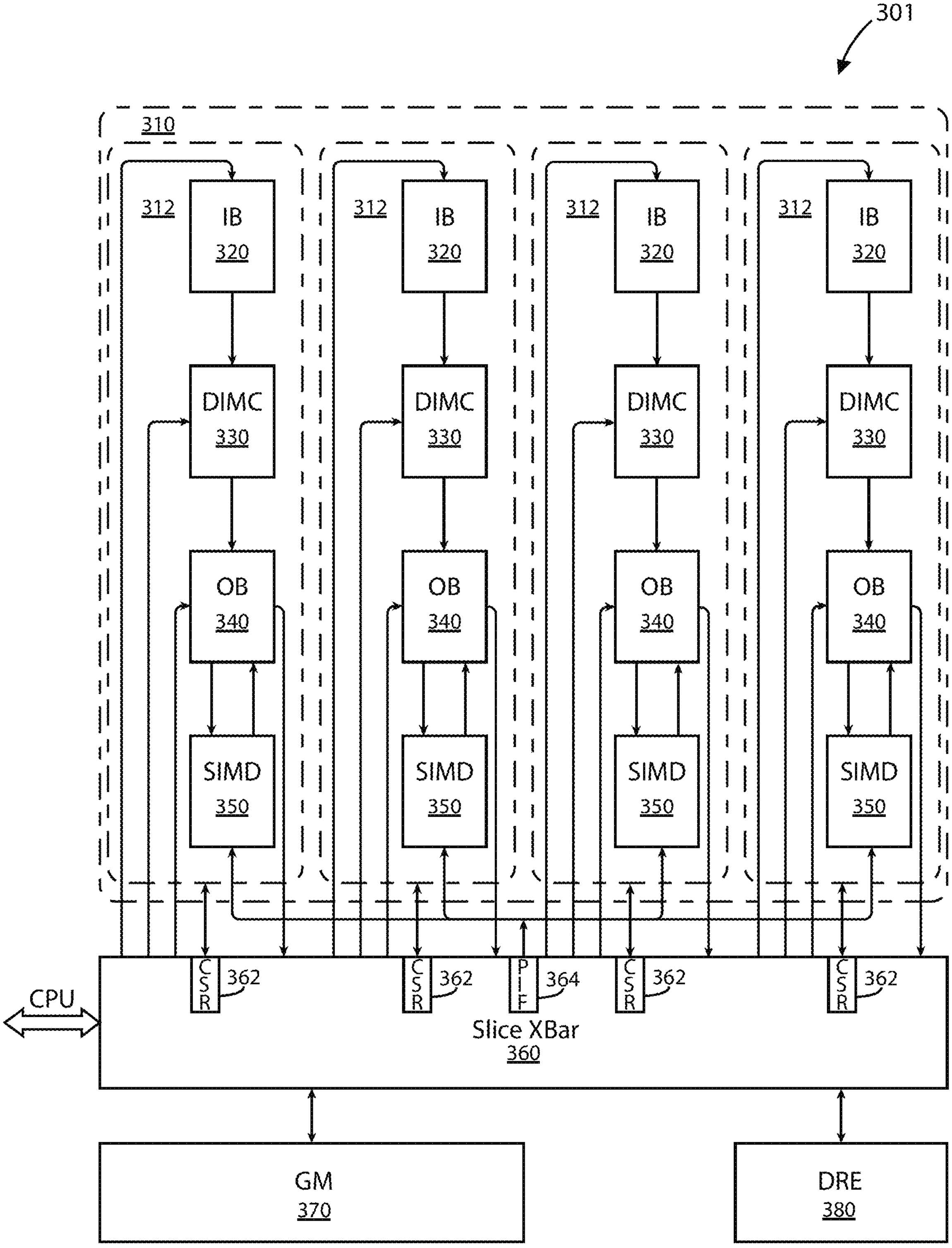
FIGS. 3A-3B are simplified block diagrams illustrating slice devices according to examples of the present invention.

FIG. 3A is a simplified block diagram illustrating an example slice device 301 of a chiplet. For the 16-slice chiplet example, slice device 301 includes a compute core 310 having four compute paths 312, each of which includes an input buffer (IB) device 320, a digital in-memory-compute (DIMC) device 330, an output buffer (OB) device 340, and a Single Instruction, Multiple Data (SIMD) device 350 coupled together. Each of these paths 312 is coupled to a slice cross-bar/controller 360, which is controlled by the tile CPU to coordinate the computations performed by each path 312.

In an example, the DIMC is coupled to a clock and is configured within one or more portions of each of the plurality of slices of the chiplet to allow for high throughput of one or more matrix computations provided in the DIMC such that the high throughput is characterized by 512 multiply accumulates per a clock cycle. In a specific example, the clock coupled to the DIMC is a second clock derived from a first clock (e.g., chiplet clock generator, AI accelerator apparatus clock generator, etc.) configured to output a clock signal of about 0.5 GHz to 4 GHz; the second clock can be configured at an output rate of about one half of the rate of the first clock. The DIMC can also be configured to support a block structured sparsity (e.g., imposing structural constraints on weight patterns of a neural networks like a transformer).

In an example, the SIMD device 350 is a SIMD processor coupled to an output of the DIMC. The SIMD 350 can be configured to process one or more non-linear operations and one or more linear operations on a vector process. The SIMD 350 can be a programmable vector unit or the like. The SIMD 350 can also include one or more random-access memory (RAM) modules, such as a data RAM module, an instruction RAM module, and the like.

In an example, the slice controller 360 is coupled to all blocks of each compute path 312 and also includes a control/status register (CSR) 362 coupled to each compute path. The slice controller 360 is also coupled to a memory bank 370 and a data reshape engine (DRE) 380. The slice controller 360 can be configured to feed data from the memory bank 370 to the blocks in each of the compute paths 312 and to coordinate these compute paths 312 by a processor interface (PIF) 364. In a specific example, the PIF 364 is coupled to the SIMD 350 of each compute path 312.

Figure 3B:
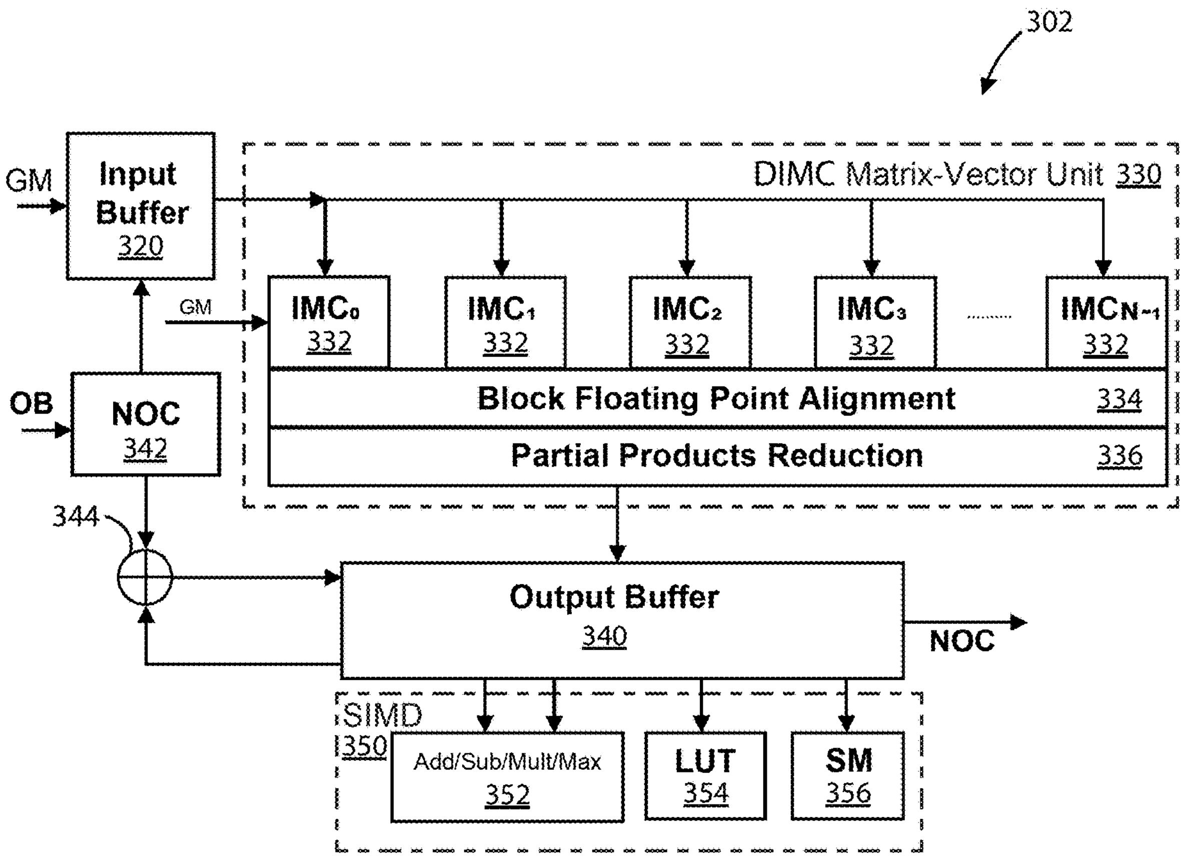

Further details for the compute core 310 are shown in FIG. 3B. The simplified block diagram of slice device 302 includes an input buffer 320, a DIMC matrix vector unit 330, an output buffer 340, a network on chip (NoC) device 342, and a SIMD vector unit 350. The DIMC unit 330 includes a plurality of in-memory-compute (IMC) modules 332 configured to compute a Scaled Dot-Product Attention function on input data to determine a probability distribution, which requires high-throughput matrix multiply-accumulate operations.

These IMC modules 332 can also be coupled to a block floating point alignment module 334 and a partial products reduction module 336 for further processing before outputting the DIMC results to the output buffer 540. In an example, the input buffer 320 receives input data (e.g., data vectors) from the memory bank 370 (shown in FIG. 3A) and sends the data to the IMC modules 332. The IMC modules 332 can also receive instructions from the memory bank 370 as well.

In addition to the details discussed previously, the SIMD 350 can be configured as an element-wise vector unit. The SIMD 350 can include a computation unit 352 (e.g., add, subtract, multiply, max, etc.), a look-up table (LUT) 354, and a state machine (SM) module 356 configured to receive one or more outputs from the output buffer 340.

The NoC device 342 is coupled to the output buffer 340 configured in a feedforward loop via shortcut connection 344. Also, the NoC device 342 is coupled to each of the slices and is configured for multicast and unicast processes. More particularly, the NoC device 342 can be configured to connect all of the slices and all of the tiles, multi-cast input activations to all of the slices/tiles, and collect the partial computations to be unicast for a specially distributed accumulation.

Considering the previous eight-chiplet AI accelerator apparatus example, the input buffer can have a capacity of 64 KB with 16 banks and the output buffer can have a capacity of 128 KB with 16 banks. The DIMC can be an 8-bit block have dimensions 64×64 (eight 64×64 IMC modules) and the NoC can have a size of 512 bits. The computation block in the SIMD can be configured for 8-bit and 32-bit integer (int) and unsigned integer (uint) computations. These slice components can vary depending on which transformer the AI accelerator apparatus will serve.

Figure 4:
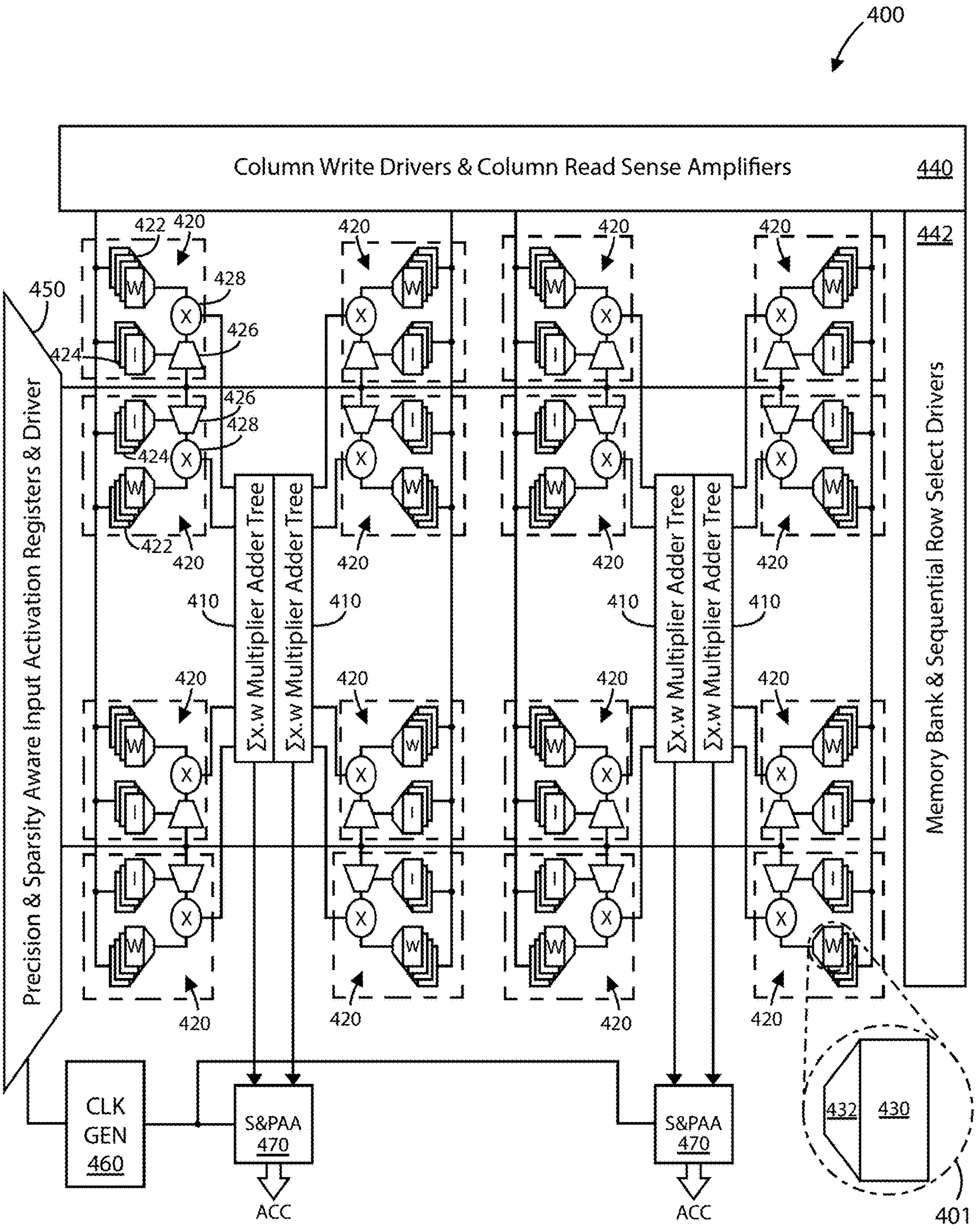
FIG. 4 is a simplified block diagram illustrating an in-memory-compute (IMC) module according to an example of the present invention.

FIG. 4 is a simplified block diagram illustrating an example IMC module 700. As shown, module 700 includes one or more computation tree blocks 410 that are configured to perform desired computations on input data from one or more read-write blocks 420. Each of these read-write blocks 420 includes one or more first memory-select units 422 (also denoted as "W"), one or more second memory-select units 424 (also denoted as "I"), an activation multiplexer 426, and an operator unit 428. The first memory-select unit 422 provides an input to the operator unit 428, while the second memory-select unit 424 controls the activation multiplexer 426 that is also coupled to the operator unit 428. In the case of multiply-accumulate operations, the operator unit 428 is a multiplier unit and the computation tree blocks 410 are multiplier adder tree blocks (i.e., Σx.w).

As shown in close-up 401, each of the memory-select units 422, 424 includes a memory cell 430 (e.g., SRAM cell, or the like) and a select multiplexer 432. Each of the memory-select units 422, 424 is coupled to a read-write controller 440, which is also coupled to a memory bank/driver block 442. In an example, the read-write controller 440 can be configured with column write drivers and column read sense amplifiers, while the memory bank/driver block 432 can configured with sequential row select drivers.

An input activation controller 450 can be coupled to the activation multiplexer 426 each of the read-write blocks 420. The input activation controller 450 can include precision and sparsity aware input activation register and drivers. The operator unit 428 receives the output of the first memory-select unit 422 and receives the output of this block 450 through the activation multiplexer 426, which is controlled by the output of the second memory-select unit 424. The output of the operator unit 428 is then fed into the computation tree block 410.

The input activation block 450 is also coupled to a clock source/generator 460. As discussed previously, the clock generator 460 can produce a second clock derived from a first clock configured to output a clock signal of about 0.5 GHz to 4 GHz; the second clock can be configured at an output rate of about one half of the rate of the first clock. The clock generator 460 is coupled to one or more sign and precision aware accumulators 470, which are configured to receive the output of the computation tree blocks 410. In an example, an accumulator 470 is configured to receive the outputs of two computation tree blocks 410.

Example output readings of the IMC are shown in FIGS. 13A-13C.

Referring back to the eight-chiplet AI accelerator apparatus example, the memory cell can be a dual bank 2×6T SRAM cell, and the select multiplexer can be an 8T bank select multiplexer. In this case, the memory bank/driver block 442 includes a dual-bank SRAM bank. Also, the read/write controller can include 64 bytes of write drivers and 64 bytes of read sense amplifiers. Those of ordinary skill in the art will recognize other variations, modifications, and alternatives to these IMC module components and their configurations.

Figure 5A:
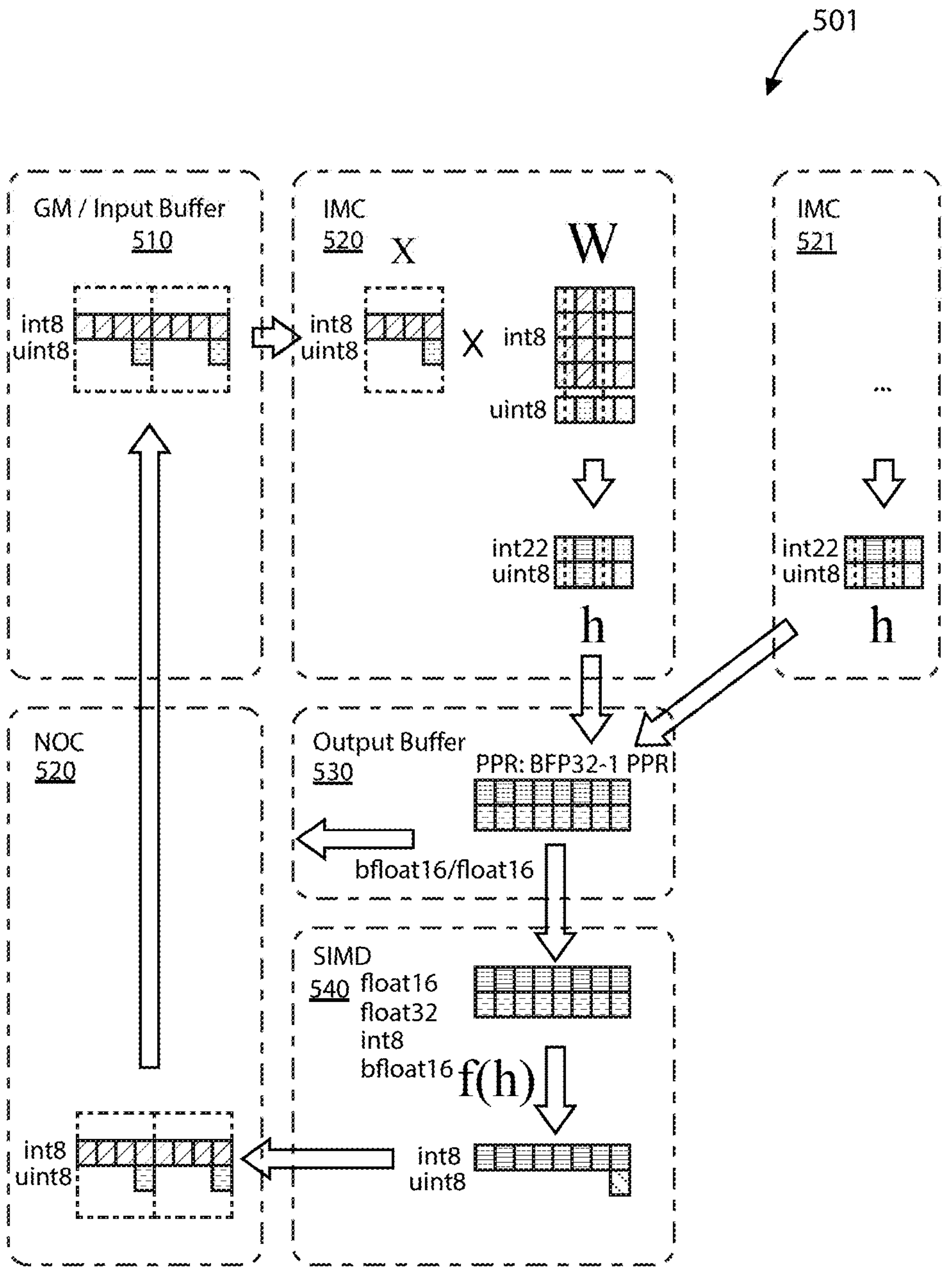
FIG. 5A is a simplified block flow diagram illustrating numerical formats of the data being processed in a slice device according to an example of the present invention.

FIG. 5A is a simplified block flow diagram illustrating example numerical formats of the data being processed in a slice. Diagram 501 shows a loop with the data formats for the GM/input buffer 510, the IMC 520, the output buffer 530, the SIMD 540, and the NoC 550, which feeds back to the GM/input buffer 510. The IMC block 520 shows the multiply-accumulate operation (Σx.w). Additionally, the format for the data from IMC 532 flows to the output buffer 530 as well. In this example, the numerical formats include integer (int), floating point (float), and block floating (bfloat) of varying lengths.

Figure 5B:
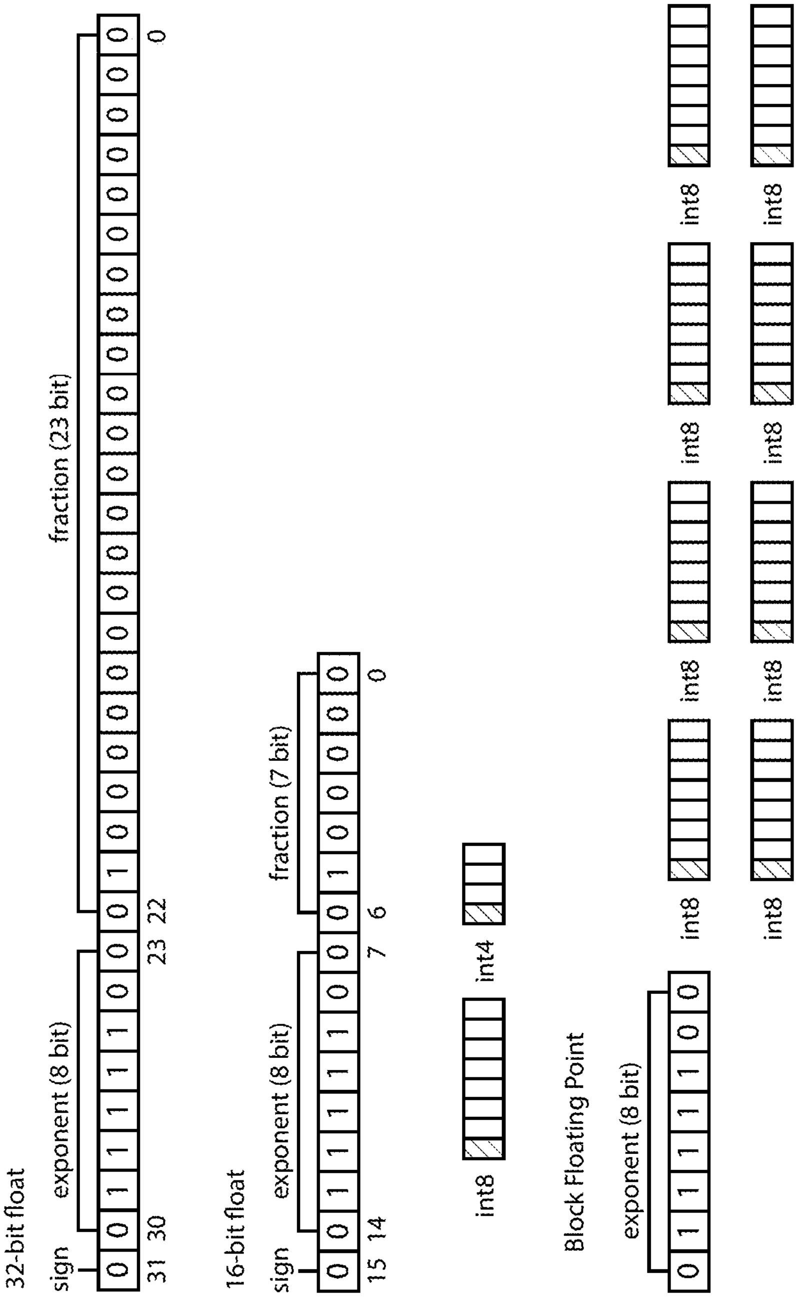
FIG. 5B is a simplified diagram illustrating example numerical formats.

FIG. 5B is a simplified diagram illustrating certain numerical formats, including certain formats shown in FIG. 5A. Block floating point numerics can be used to address certain barriers to performance. Training of transformers is generally done in floating point, i.e., 32-bit float or 16-bit float, and inference is generally done in 8-bit integer ("int8"). With block floating point, an exponent is shared across a set of mantissa significant values (see diagonally line filled blocks of the int8 vectors at the bottom of FIG. 5B), as opposed to floating point where each mantissa has a separate exponent (see 32-bit float and 16-bit float formats at the top of FIG. 5A). The method of using block floating point numerical formats for training can exhibit the efficiency of fixed point without the problems of integer arithmetic, and can also allow for use of a smaller mantissa, e.g., 4-bit integer ("int4") while retaining accuracy. Further, by using the block floating point format (e.g., for activation, weights, etc.) and sparsity, the inference of the training models can be accelerated for better performance. Those of ordinary skill in the art will recognize other variations, modifications, and alternatives to these numerical formats used to process transformer workloads.

Figure 6:
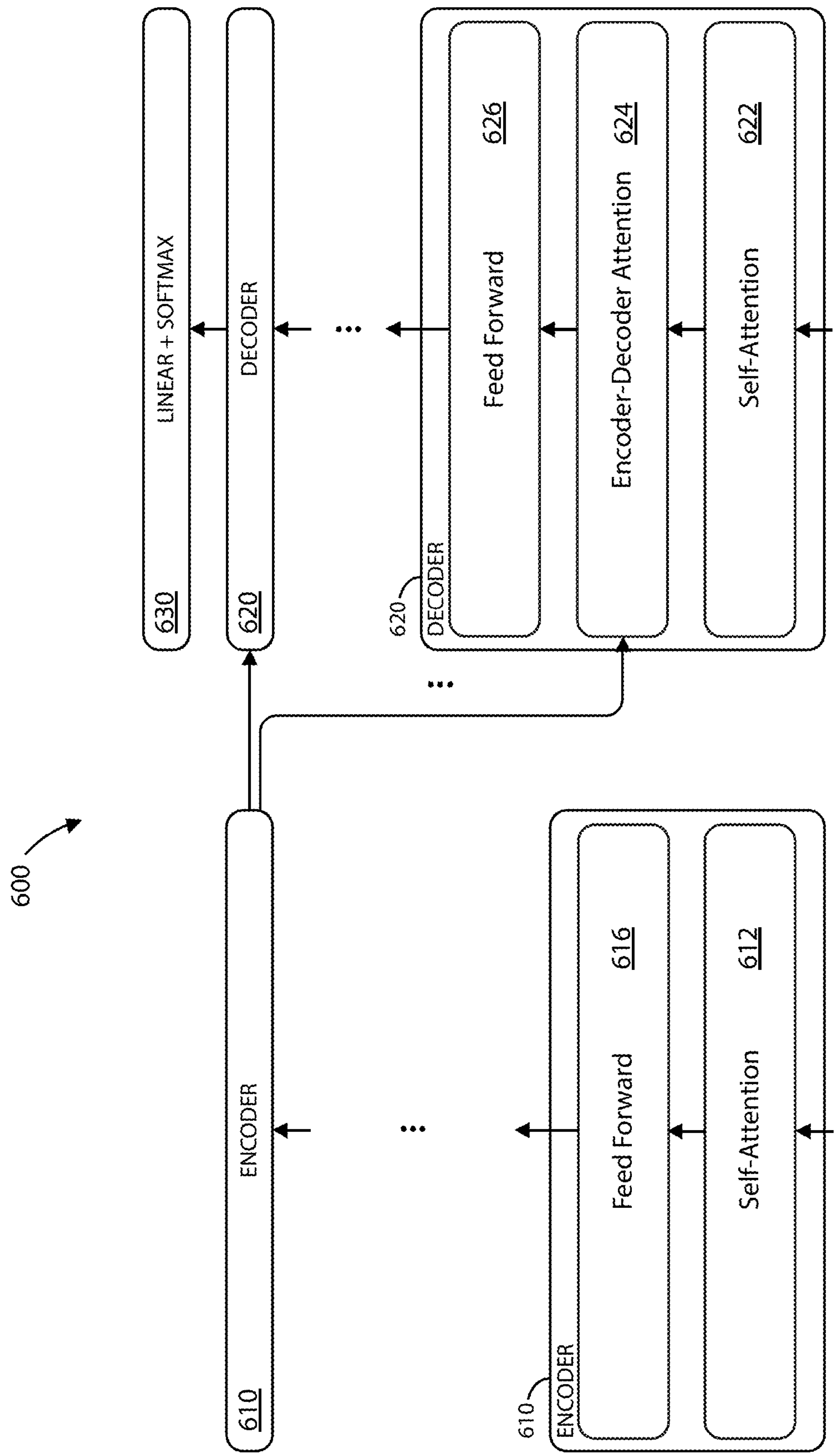
FIG. 6 is a simplified block diagram of a transformer architecture.

FIG. 6 illustrates a simplified transformer architecture 600. The typical transformer can be described as having an encoder stack configured with a decoder stack, and each such stack can have one or more layers. Within the encoder layers 610, a self-attention layer 612 determines contextual information while encoding input data and feeds the encoded data to a feed-forward neural network 616. The encoder layers 610 process an input sequence from bottom to top, transforming the output into a set of attention vectors K and V. The decoder layers 620 also include a corresponding self-attention layer 622 and feed-forward neural network 626, and can further include an encoder-decoder attention layer 624 uses the attention vectors from the encoder stack that aid the decoder in further contextual processing. The decoder stack outputs a vector of floating points (as discussed for FIG. 5B), which is fed to linear and softmax layers 630 to project the output into a final desired result (e.g., desired word prediction, interpretation, or translation). The linear layer is a fully-connected neural network that projects the decoder output vector into a larger vector (i.e., logits vector) that contains scores associated with all potential results (e.g., all potential words), and the softmax layer turns these scores into probabilities. Based on the probability output, the projected word meaning may be chosen based on the highest probability or by other derived criteria depending on the application.

Transformer model variations include those based on just the decoder stack (e.g., transformer language models such as GPT-2, GPT-3, etc.) and those based on just the encoder stack (e.g., masked language models such as BERT, BERT Large, etc.). Transformers are based on four parameters: sequence length(S) (i.e., number of tokens), number of attention heads (A), number of layers (L), and embedding length (H). Variations of these parameters are used to build practically all transformer-based models today. Embodiments of the present invention can be configured for any similar model types.

A transformer starts as untrained and is pre-trained by exposure to a desired data set for a desired learning application. Transformer-based language models are exposed to large volumes of text (e.g., Wikipedia) to train language processing functions such as predicting the next word in a text sequence, translating the text to another language, etc. This training process involves converting the text (e.g., words or parts of words) into token IDs, evaluating the context of the tokens by a self-attention layer, and predicting the result by a feed forward neural network.

The self-attention process includes (1) determining query (Q), key (K), and value (V) vectors for the embedding of each word in an input sentence, (2) calculating a score for from the dot product of Q and K for each word of the input sentence against a target word, (3) dividing the scores by the square root of the dimension of K, (4) passing the result through a softmax operation to normalize the scores, (5) multiplying each V by the softmax score, and (6) summing up the weighted V vectors to produce the output.

Many things impact the performance of such transformer architectures. The softmax function tends to be the critical path of the transformer layers (and has been difficult to accelerate in hardware). Requirements for overlapping the compute, SIMD operations and NoC transfers also impacts performance. Further, efficiency of NoC, SIMD, and memory bandwidth utilization is important as well.

Different techniques can be applied in conjunction with the AI accelerator apparatus and chiplet device examples to improve performance, such as quantization, sparsity, knowledge distillation, efficient tokenization, and software optimizations. Supporting variable sequence length (i.e., not requiring padding to the highest sequence lengths) can also reduce memory requirements. Other techniques can include optimizations of how to split self-attention among slices and chips, moving layers and tensors between the slices and chips, and data movement between layers and FC matrices.

According to an example, the present invention provides for an AI accelerator apparatus (such as shown in FIGS. 1A and 1B) coupled to an aggregate of transformer devices (e.g., BERT, BERT Large, GPT-2, GPT-3, or the like). In a specific example, this aggregate of transformer devices can include a plurality of transformers configured in a stack ranging from three to N layers, where N is an integer up to 128.

In an example, each of the transformers is configured within one or more DIMCs such that each of the transformers comprises a plurality of matrix multipliers including QKV matrices configured for an attention layer of a transformer followed by three fully-connected matrices (FC). In this configuration, the DIMC is configured to accelerate the transformer and further comprises a dot product of Q $K^T$ followed by a softmax (Q $K^T$/square root ($d_k$)) V. In an example, the AI accelerator apparatus also includes a SIMD device (as shown in FIGS. 3A and 3B) configured to accelerate a computing process of the softmax function.

Using a transformer like BERT Large, NLP requires very high compute (e.g., five orders of magnitude higher than CV). For example, BERT Large requires 5.6 giga-multiply-accumulate operations per second ("GMACs") per transformer layer. Thus, the NLP inference challenge is to deliver this performance at the lowest energy consumption.

Although the present invention is discussed in the context of a BERT Large transformer for NLP applications, those of ordinary skill in the art will recognize variations, modifications, and alternatives. The particular embodiments shown can also be adapted to other transformer-based models and other AI/machine learning applications.

According to an example, the present invention provides for a dispatch engine (DE) apparatus using a hardware and software co-designed structure for efficient distributed control over the execution of AI-related workloads in an AI accelerator apparatus. The DE apparatus is a dedicated hardware unit configured to manage resource availability, dispatch work units asynchronously, and aggregate work unit completions.

Figure 7A:
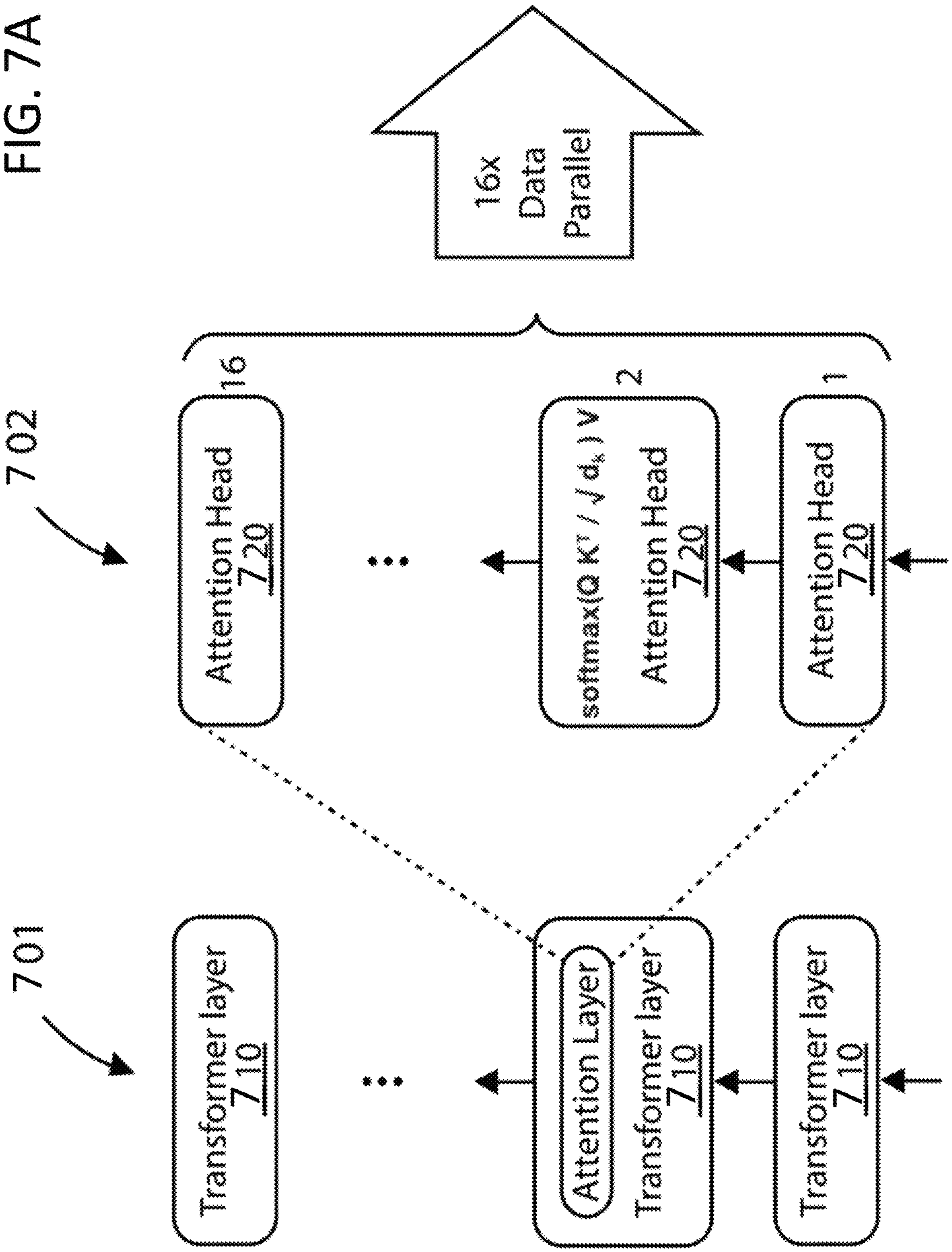
FIGS. 7A-7B are simplified block flow diagrams illustrating a mapping process between a transformer and an AI accelerator apparatus according to an example of the present invention.
Figure 7B:
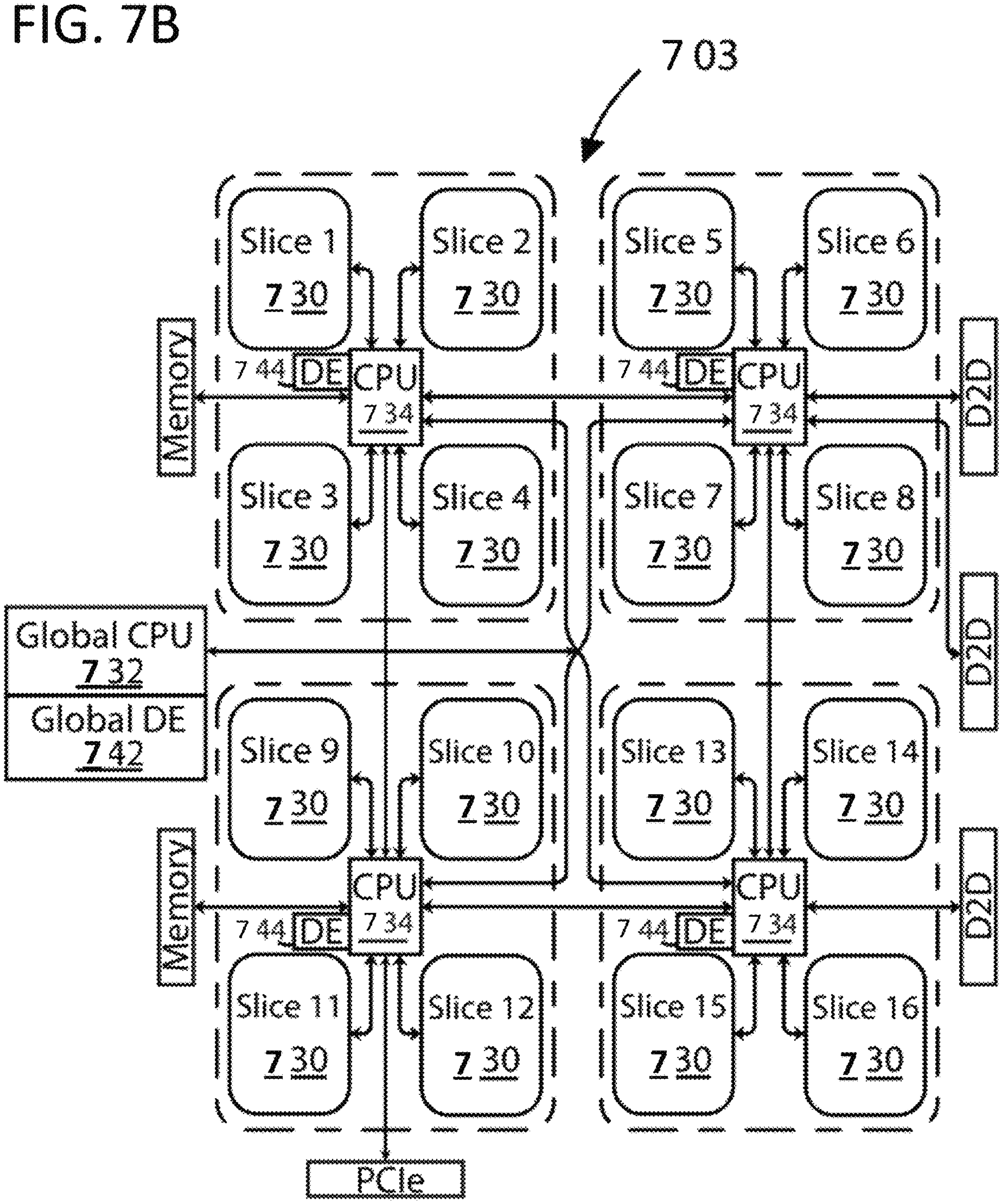

FIGS. 7A-B are simplified block flow diagrams illustrating a mapping process between a transformer and an example AI accelerator apparatus. As shown, a transformer 701 includes a plurality of transformer layers 710, each having an attention layer 702. In this case, there are 16 attention heads 710 (e.g., BERT Large) computing the attention function as discussed previously. These 16 attention heads are mapped to 16 slices 730 of an AI accelerator apparatus 703 (similar to apparatuses 201 and 202) via global CPU 732 communicating to the tile CPUs 734. Further, a global DE 742 is configured with the global CPU 732 to communicate with the tile CPUs 734, and tile DEs 744 are configured with the tile CPUs 734 to communicate with the slices 730.

Figure 8:
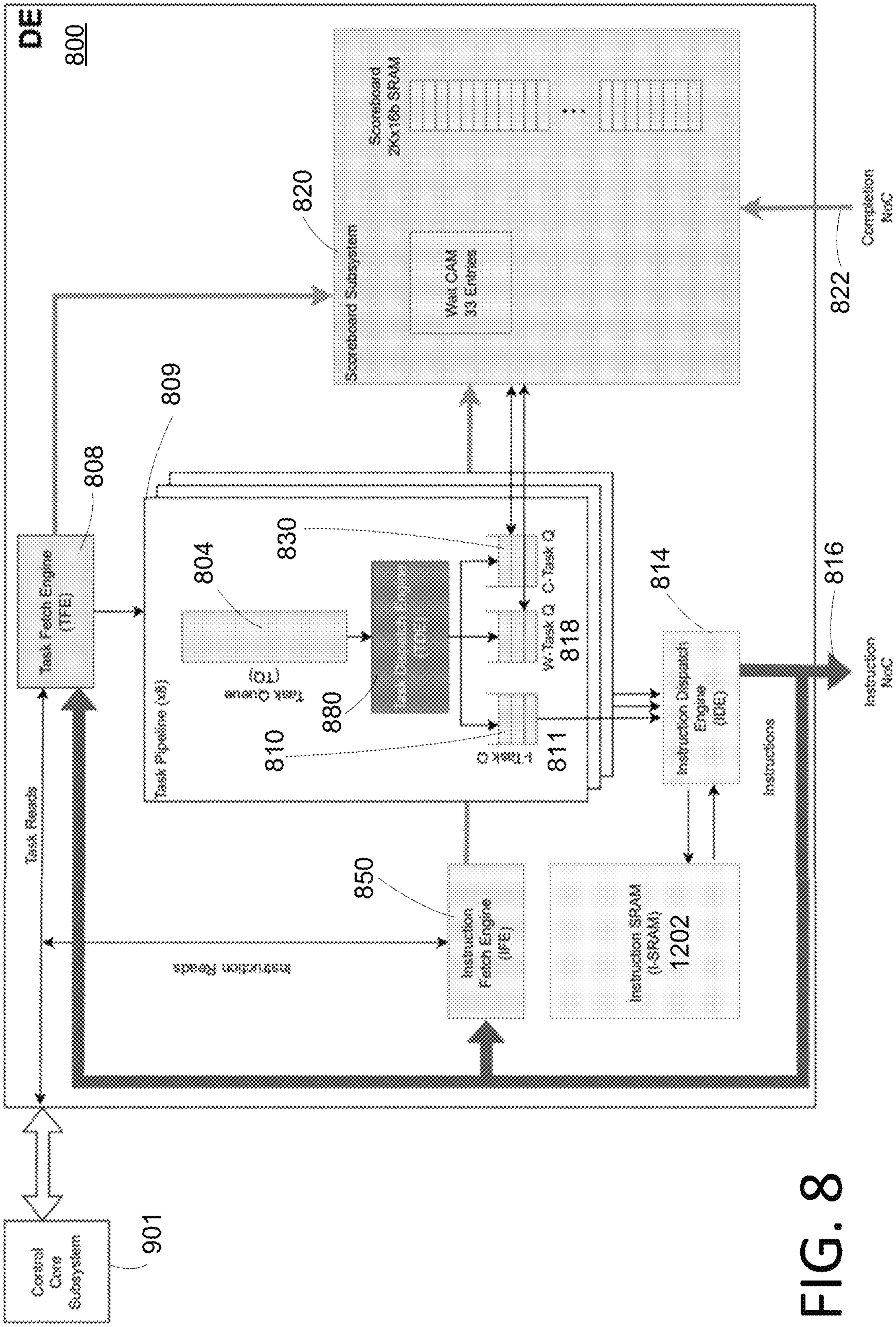
FIG. 8 is a simplified block diagram of a dispatch engine according to an alternative embodiment.

FIG. 8 shows a simplified block diagram of a dispatch engine 800 according to an alternative embodiment. This Dispatch Engine (DE) achieves high throughput by dispatching instructions to compute units, and tracking and resolving dependencies between instructions in hardware. Processing is initiated by the Gang CPU control core, after which the DE can execute with a high-degree of autonomy.

The Gang CPU preloads bootstrapping commands into the Instruction SRAM (I-SRAM) 802, and tasks into one or more Task Queues (TQs) 804. In some embodiments, just one task may be pushed to the IDE, and that task will load the rest of the tasks autonomously. These bootstrap tasks may initiate further fetching of I-SRAM entries and tasks to execute the workload graph.

The Task Fetch engine 808 is responsible for fetching tasks into the TQs within each Task Pipeline 809. Each Task Pipeline operates independently.

Instruction Tasks (I-Tasks) 810 are placed in an I-Task queue 811 for dispatch by the Instruction Dispatch Engine (IDE) 814. The IDE will arbitrate across I-Task Queues, read the referenced I-SRAM entry, and send the resulting write to the Instruction NoC interface 816.

Barrier tasks (W-Tasks) 818 send a Wait request to the Scoreboard Subsystem 820. The queue will stall until the Scoreboard Subsystem indicates that the dependency has been satisfied (e.g., a workload is complete).

Completion tasks (C-Tasks) provide additional management of dependencies. C-Tasks support non-deterministic control-flow within the graph.

When compute units complete instructions, they will send completions back to the DE via the Completion Interface 822. These are routed to the Scoreboard Subsystem to release waiting dependencies.

Instructions may generate multiple completions to indicate completion of different steps in the instruction execution. Such steps can include but are not limited to:

- instruction has begun execution,
- instruction has completed execution at the compute unit, and/or
- data has arrived at the destination.

AI workloads can achieve a high degree of efficiency by waiting for the appropriate step in instruction execution.

The Gang CPU is notified via interrupts when the DE needs servicing. This can occur when an error is detected or the TQs become empty.

Figure 9:
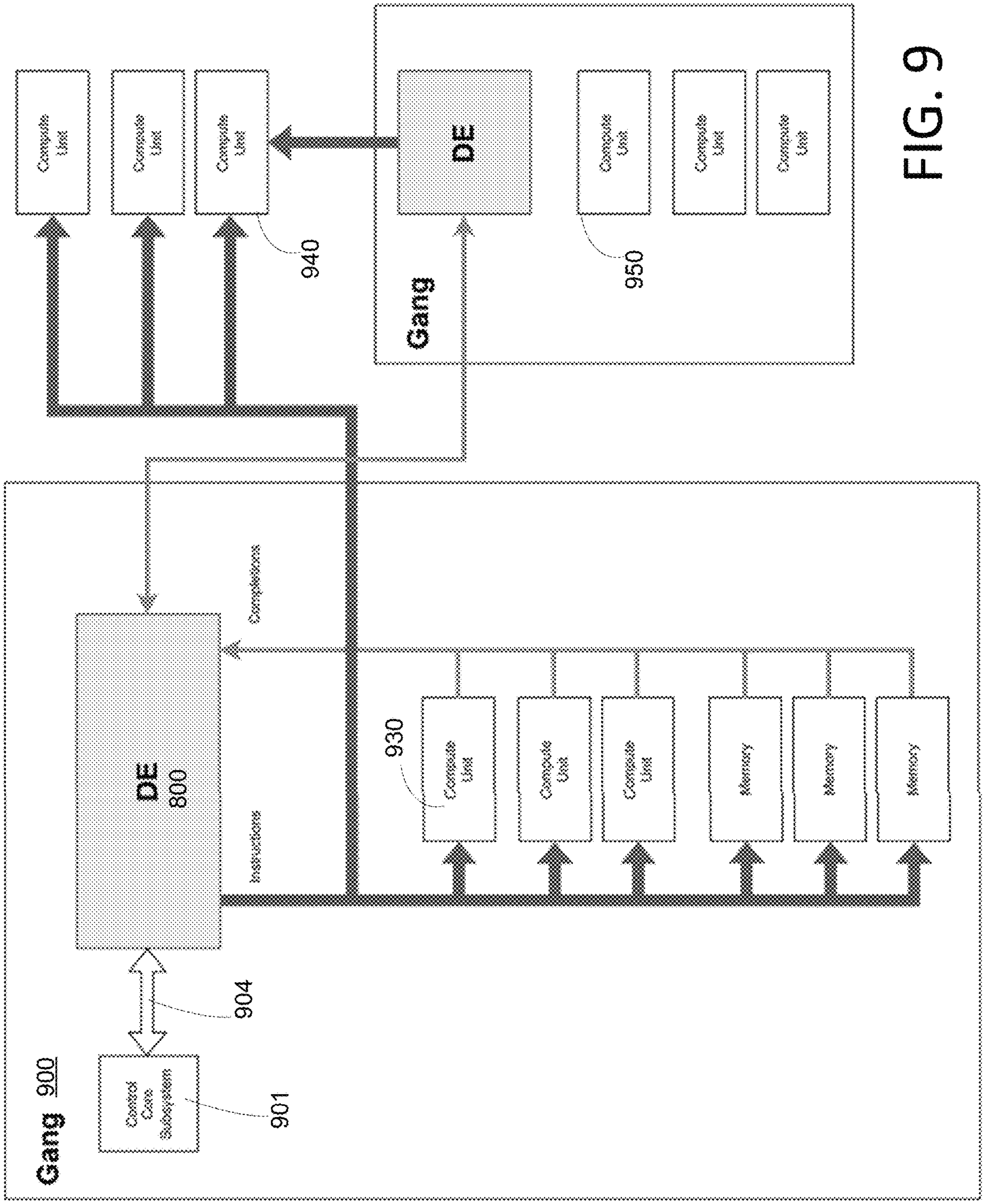
FIG. 9 is a simplified block diagram of a system including a dispatch engine according to an embodiment.

FIG. 9 presents a simplified Gang-Level System Block Diagram. This shows the DE 800 integrating with other components within a Gang 900.

In this particular embodiment, the DE interfaces directly with the Gang control core 901 at least as follows.

- The DE will fetch tasks and I-SRAM contents from the Gang control core. This ensures that such reads are I/O coherent.
- The DE sends interrupts to the control core via an interrupt interface 904.
- The Gang control core can service the DE via MMIO loads and stores to control and status registers (CSRs) within the DE for such activities as bootstrapping, error diagnosis and debug.

The DE may send instructions to a variety of compute units within the system. These may include but are not limited to:

- compute units 930 within the Gang,
- shared compute units at the chiplet level 940 that are not part of any Gang, and
- compute units 950 in other gangs.

This communication may happen over shared or private on-chip networks.

To improve parallelism, a single instruction dispatch from the DE may be multi-cast to multiple compute units in the system. Each compute unit would then execute its copy of the instruction.

Instructions are sent down to execution units. Each execution unit has an instruction queue for holding one more instructions.

When an instruction is completed, or reaches a significant point in its execution, a completion is returned to the DE via interface 822. Note that multi-cast instructions may return a completion per multi-cast copy, or some or all multi-cast completions may be coalesced before reaching the DE. In either case, the DE updates state in the dependency scoreboard.

A completion references a single entry in the scoreboard. Hence a small amount of information is represented, for instance 11b, depending on how many entries are in the scoreboard.

Task types and encoding according to embodiments are now discussed. There are three types of tasks.

A first task type is an Instruction Task (I-Task). These dispatch an instruction to one or more compute units. Each I-Task references an entry in the I-SRAM that holds the instruction to dispatch. Each I-Task contains an identifier (e.g., address) of the compute unit(s) to which the instruction is dispatched.

A second task type is a Wait Task (W-Task). These perform a wait on a specific scoreboard entry, identified by a scoreboard entry identifier (SID). In a particular embodiment, the SID may be an 11*b* integer that specifies one of the 2048 scoreboard entries to query.

W-Tasks wait for a specific number of completions to arrive at that scoreboard entry. Synchronous W-Tasks will stall later I-Tasks and C-Tasks until the wait is satisfied.

Asynchronous W-Tasks wait at the scoreboard but do not stall later tasks. Asynchronous W-Tasks support non-deterministic graphs.

A Wait Task includes:

- the SID to wait on,
- the number of completions to wait for, and
- the number of waits that will be performed for that dependency.

The W-Task may be sent to the Scoreboard Subsystem. The Scoreboard Subsystem tracks the state of that scoreboard entry.

When the completions have arrived, the wait is satisfied. The task queue(s) may be unblocked. When the waits have arrived as well, the scoreboard entry may be reset for reuse by another dependency later in the program.

If the wait is asynchronous, the I-Task Queue (ITQ) will not be stalled. This is to support make-up waits for non-deterministic execution. The wait may still be held in the Wait-Task Queue (WTQ) until all completions are received.

Multiple waits can arrive from the same or different pipelines. And, multiple completions can arrive from the same or different instructions. In general, the waits and completions can arrive in any order.

A third task type is a Completion Task (C-Task) 830. These send one or more completions to a specific SID, without a corresponding instruction dispatch. This supports dispatch dependencies and non-deterministic graphs.

A C-Task sends one or more completions to a SID. As with completions from instructions, these C-Task completions may release waiters waiting on that SID. The C-Task will stall until all prior I-Tasks have won arbitration at the IDE. This use case is for inter-queue dispatch dependencies.

Instructions contain the SID(s) for completions returned to the DE. The compute units will use the SID information to generate the completion back to the DE at the appropriate point(s) in its execution.

FIG. 8 also shows the completion interface 822. The DE receives completions from compute units on the completion interface. These may include compute units within the Gang, or outside of the Gang. In addition, memory units may send completions when they determine that output data from instructions has been completely written.

DEs may send completions directly to each other. This support inter-Gang synchronization.

The IFE represents a compute unit within the DE. The IFE receives an instruction that fetches instruction data from memory and writes it into the I-SRAM. As with other instructions, IFE instructions can produce completions.

The Task Fetch Engine (TFE) 808 of the embodiment of FIG. 8 is now described. The TFE represents a compute unit within the DE. The TFE fetches tasks into the TQs.

The TFE is a single unit, but has 8 channels, one per Task Pipeline. Logically, it appears as eight separate DMA engines.

Each channel has a separate compute unit address. Which channel (and therefore which Task Pipeline will receive the tasks) is determined by the instruction address in the task fetch I-Task.

The TFE channels receive instructions that fetch task data from memory. The TFE writes the tasks into the task queues.

As the tasks are executed, the task queues drain. The TFE will automatically fetch additional tasks into the task queues as needed. Each channel operates independently and will fetch tasks as needed. As with instructions, TFE instructions may generate completions.

It is the IDEs responsibility to detect instruction addresses targeting the IFE and TFE, and to route the instruction to the correct compute unit. If more than 3 commands are received on the same channel, an error is raised.

When a fetch command is completed, the TFE will (optionally) generate a single completion to the local SID indicated. This completion interface is internal to the DE. Completions coming in on the completion interface have priority, as there is no back-pressure on that interface.

Both the TFE and IFE may read their data through the Gang control core subsystem. This ensures that the data read is IO coherent with the control core subsystem.

The TFE will arbitrate among the pipelines for read requests appropriately. Pipelines that are empty have priority over non-empty pipelines.

The task pipelines of FIG. 8 are now described. The tasks in the task pipelines are 8B tasks executed on a dispatch queue.

Each of the 8 task pipelines is responsible for an in-order stream of tasks. The Task Pipelines operate as follows.

Task Queues are FIFO queues of 8B tasks. The tasks are loaded from the TFE. The TQs can deliver one task each cycle to the Task Dispatch Engine (TDE) 880, from the head of the queue.

A TDE represents a stage of a task Pipeline where tasks are decoded. The TDE is responsible for decoding the tasks and handling them appropriately. I-Tasks are sent on to the ITQ, W-Tasks are placed in the WTQ, and C-Tasks are placed in the CTQ. If any queue is full, the TDE may stall.

The TDE will tag tasks with appropriate dependencies as they are placed in the queues. I-Tasks may have dependencies on prior W-Tasks in the WTQ. C-Tasks may have dependencies on prior W-Tasks in the WTQ, and I-Tasks in the ITQ.

C-Tasks are sent to the Scoreboard Subsystem for processing. The TDE has 4 outstanding completion commands, and receives credits back from the Scoreboard before sending more. Otherwise, C-Tasks do not stall the TDE.

C-Tasks are used to identify when a task queue has reached a particular point in I-Task dispatch. Therefore C-Tasks will not dispatch to the Scoreboard Subsystem until prior I-Tasks have dispatched from the ITQ to the IDE.

Details regarding wait tasks and WTQs are now described. Wait tasks are sent to the Scoreboard Subsystem to perform the wait operation. Wait tasks do not wait until they are the head of the queue to go to the scoreboard, but can be sent directly to the scoreboard in parallel with being inserted into the WTQ. The TDE and scoreboard support multiple (e.g., 4) outstanding wait tasks per task pipeline.

The WTQ is maintained as a circular queue. Waits may be satisfied out-of-order, but leave the WTQ in-order. This is relevant to SID allocation by the compiler.

In the WTQ, entries may be in one of 3 states:

Invalid: No wait in the entry.

Valid, not satisfied: Wait dependency has not been cleared.

Valid, satisfied: Wait dependency has been cleared, but the scoreboard may still have the wait internally.

There are two mechanisms by which waits in the WTQ can be satisfied. The first path is through the scoreboard.

There, completions arrive at the scoreboard. The scoreboard correctly counts them. The scoreboard sends a notification to the pipeline(s) indicating all completions have been received for that SID, which clears all waits on that SID.

The second path is that the pipelines directly monitor incoming completions. Incoming completions are broadcast to the WTQ entries. If all the needed completions are seen, then the wait dependency can be cleared. Since the completions go directly to the pipelines, the wake-up latency is reduced.

The I-Task Queue (ITQ) according to an embodiment is now described. The ITQ represents the hand-off from the TDE to the IDE. The ITQ holds multiple (e.g., 4) I-Tasks. I-Tasks in the ITQ must wait for prior W-Tasks to be satisfied before arbitrating with the IDE. As W-Tasks in the WTQ are satisfied, later I-Tasks may be released.

If the oldest ITQ entry has prior unsatisfied W-Tasks in the WTQ, the entry may arbitrate with the IDE. The IDE will arbitrate between all 8 ITQs to select the next I-Task to dispatch. One I-Task can be pushed from one ITQ each cycle. The dispatch rate from the IDE may be lower.

The C-Task Queue (CTQ) according to an embodiment is now described. The CTQ holds four C-Tasks. C-Tasks in the CTQ must wait for prior W-Tasks to be satisfied before being sent to the scoreboard. In addition, C-Tasks in the CTQ must wait for all prior I-Tasks to leave the ITQ (win arbitration with the IDE). This ensures that any later I-Task dependent (via the scoreboard) on the C-Task will indeed be dispatched after I-Tasks before the C-Task. Once these conditions are met.

C-Tasks are sent to the scoreboard in FIFO order. Once the C-Task reaches the scoreboard, it will increase the completion count of its SID.

The Instruction Dispatch Engine (IDE) of the embodiment of FIG. 8 is now described.

The IDE is responsible for arbitrating among the 8 pipelines, plus the sideband I-Task CSR from the control core 901. After selecting an I-Task to dispatch, IDE will read the instruction from the I-SRAM, at the location indicated by the I-Task. It will then send the instruction out the instruction NoC. In some embodiments, an instruction may take multiple beats on the Instruction NoC. In this case it will take multiple cycles to read the I-SRAM and send the instruction out the Instruction NoC.

The IDE can also implement dispatch pacing. A goal of dispatch pacing is to limit the rate of instruction dispatch to avoid overrunning the performance tracing subsystem. This will provide reliable tracing at the possible expense of some performance. In a production mode, dispatch pacing may be turned off. It can be configured during workload debug to provide more complete tracing.

Figure 10:
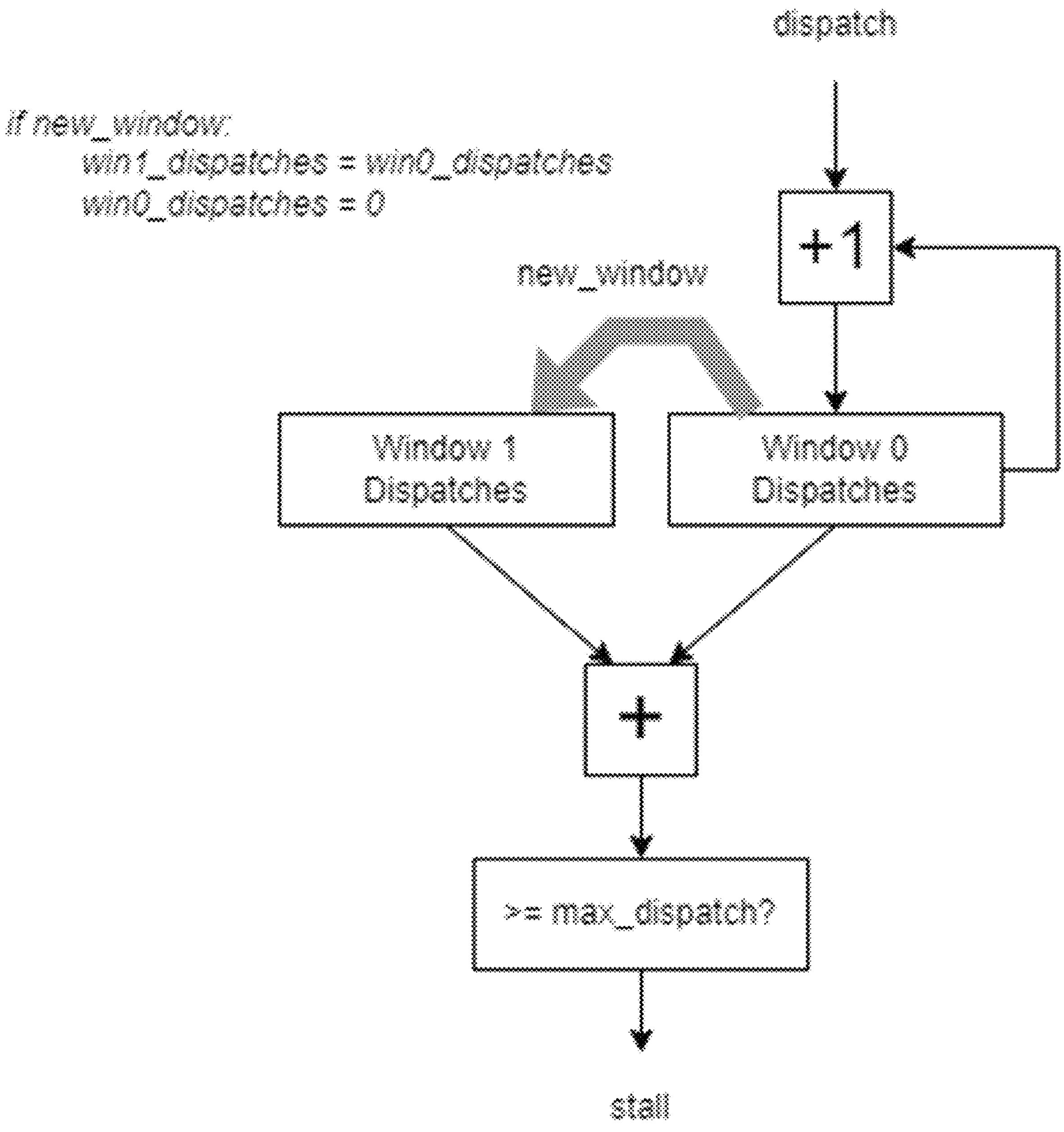
FIG. 10 is a simplified diagram illustrating operation of a dispatch pacing mechanism.

FIG. 10 shows a simplified diagram illustrating the dispatch pacing mechanism. This limits bursts of dispatches, while not slowing down dispatching in non-bursty situations.

Two parameters may be used for dispatch pacing:

1) Max_dispatch: Maximum number of dispatches

2) Pacing_window: Window size

Dispatches will be limited to max_dispatch over two windows of pacing_window cycles. Attempts to dispatch more than that will be stalled until one or two windows complete. For example, if the max_dispatch is 8 and pacing_window is 32 cycles, then no more than 8 dispatches will occur over 64 cycles, two consecutive 32-cycle windows. This can be checked by counting the dispatches in each pacing_window period, keeping the counts for two consecutive windows. Each window, shift the counts down and zero the first count. Dispatch is stalled if the sum of the counts >=max_dispatch.

The Instruction SRAM (I-SRAM) 802 of the embodiment of FIG. 8 is now described. The I-SRAM stores a table of instructions referenced by tasks. In this particular embodiment, the I-SRAM is a 4K×64B=256 KB SRAM for holding instructions.

I-Tasks reference one of the 4K entries via a 12b index. This provides the instruction sent to the compute unit. In some embodiments, different instructions can be of different sizes.

For large workloads, the amount of instruction data may exceed the capacity of the I-SRAM (4K instructions). The task graph can be preprogrammed to manage overlays in I-SRAM without control core involvement. It does this by inserting I-SRAM fetch tasks at appropriate places within the execution. Normal scoreboard-based dependencies are used to handle WAR and RAW dependencies.

For performance, I-SRAM fetches may be overlapped with computation. Hence the next set of CSR data may be fetched as early as possible. I-SRAM can be managed using double/triple/quadruple buffering, etc.

The Instruction Fetch Engine (IFE) 850 of the embodiment of FIG. 9 is now described.

The IFE is a compute unit containing a DMA engine that fetches instructions into the I-SRAM. Fetch commands are received from the IDE as normal instructions.

When a fetch command is completed, the TFE will (optionally) generate a single completion to the SID indicated by the I-Task. This completion interface is internal to the DE.

The I-SRAM has a single read/write port. So, the DE arbitrates between IFE writes and IDE reads. IFE writes are expected may have priority to reduce buffering of read responses.

Figure 11A:
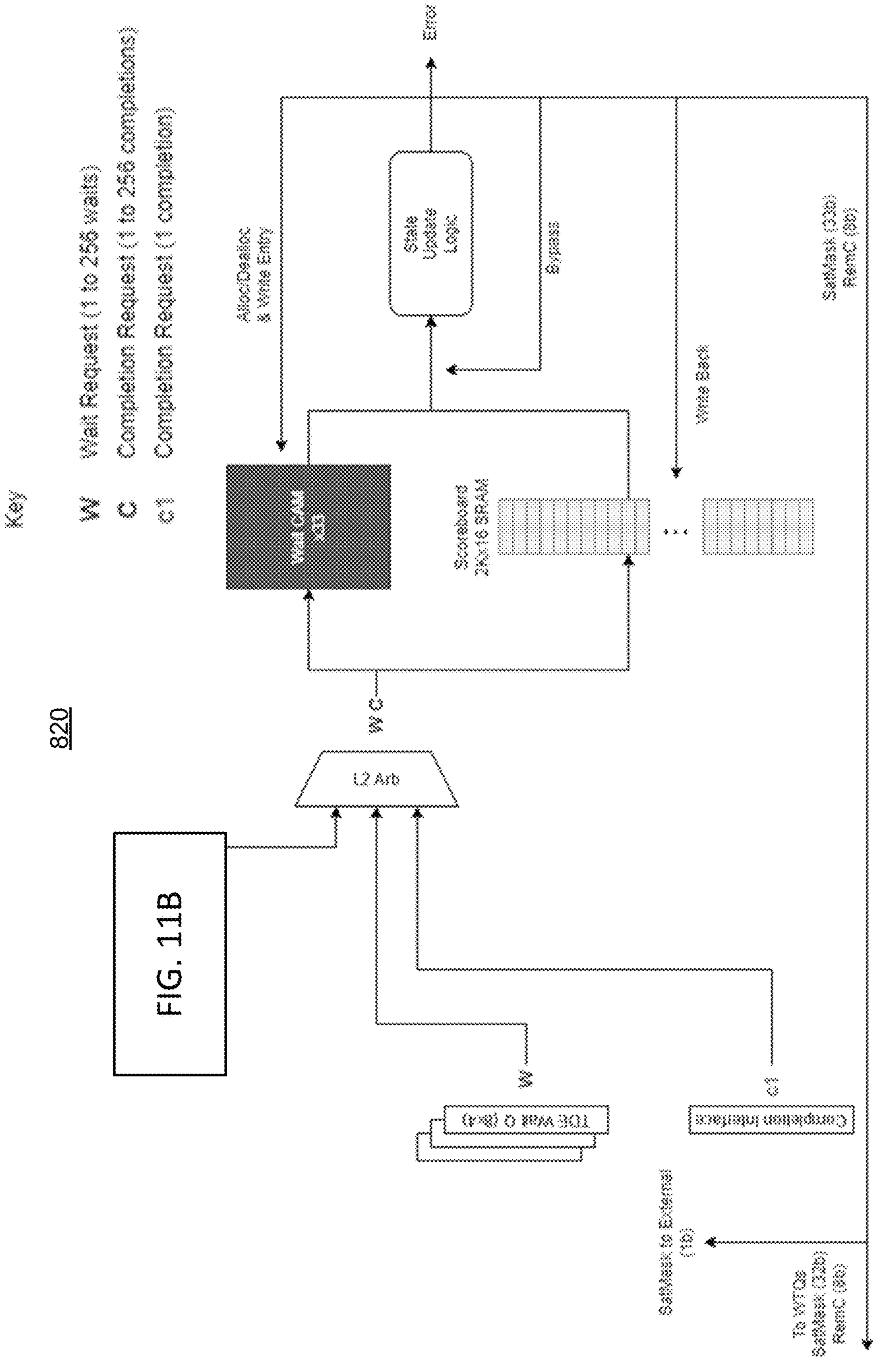
FIGS. 11A-11B show a scoreboard system of a dispatch engine according to an embodiment.
Figure 11B:
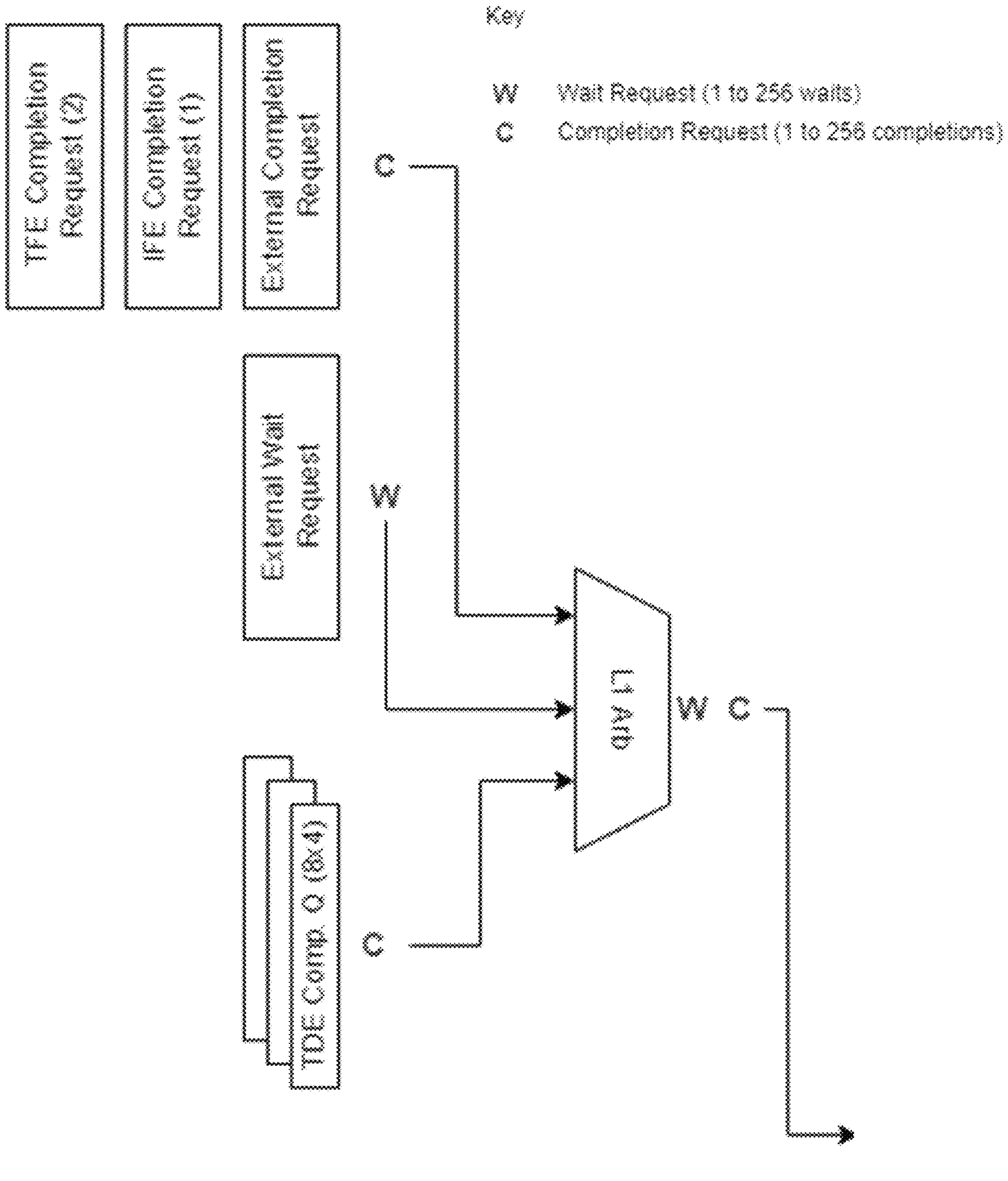

The scoreboard subsystem 820 of the embodiment of FIG. 8 is now discussed. FIGS. 11A and 11B show detailed views of the scoreboard subsystem.

The Scoreboard Subsystem is responsible for tracking inter-task dependencies via scoreboard entries. The scoreboard subsystem:

- processes one completion/wait request per cycle,
- holds scoreboard state in the Scoreboard, and
- holds wait requests in the Wait Content Addressable Memory (CAM).

The scoreboard holds 2K×16b scoreboard entries. In a particular embodiment, each entry may comprise:

1. Completion Count (CC) (8b)—Number of completions received
2. Wait Count (WC) (8b)—Number of waits received In other embodiments, the entry may comprise a flag and one counter.

The scoreboard has 1 read port and 1 write port. The scoreboard can both read and write an entry every cycle.

The Wait CAM contains 33 entries (8 pipelines×4-entry WTQ+1 external). Each entry holds:

1. Valid (1b)
2. SID (11b)
3. ExW (8b): Number of expected waits for the SID (1 to 255)
4. ExC (8b): Number of expected completions for the SID (1 to 255)

Waits may arrive from the WTQs or the external control-core interface. In an embodiment, a Wait may include:

1. SID (11b)
2. ExW (8b): Number of expected waits for this dependency
3. ExC (8b): Number of expected completions for this dependency
4. Num (8b): Number of waits. A single Wait operation may represent multiple waits.

ExC is the number of completions that must arrive to satisfy the dependency. ExW is the number of waits that will be performed on the dependency. This is used to reset the scoreboard state once the waits and completions have arrived.

When a Wait arrives from the WTQ, if all the completions have arrived, CC==ExC. Then, the WTQ is informed that the wait has been satisfied. Otherwise, the Wait is entered into the Wait CAM to await further completions.

WC is incremented for the Wait (WC+=Num). If all completions have arrived (CC==ExC) and all waits have arrived (WC==ExW), then tracking is complete for that dependency, and the score board entry is reset (CC-0, WC-0). This allows the entry to be reused again for another dependency.

Completions may arrive either from the pipeline CTQ, the Completion NoC interface or the external control core interface. Completions include:

1. SID (11b)
2. Num (8b): Number of completions. A single Completion operation may represent multiple completions.

When a completion arrives, the CC value for that scoreboard entry is incremented (CC+=Num). In addition, the Wait CAM is consulted for any waits waiting on that SID.

If all completions have arrived (CC==ExC), then all matching Waits are removed from the Wait CAM, and the corresponding WTQs are informed that those Waits have been satisfied.

When the WTQ is informed that a Wait has been satisfied, it will mark that WTQ entry as so. This may result in the WTQ entry being freed, I-Tasks in the ITQ being released, and C-Tasks in the CTQ being released.

Note that this system embodiment supports multiple producers (waiting on multiple instructions to complete), by having multiple instructions target the same SID. The ExC value is just increased as needed.

Also note that this system embodiment supports multiple consumers (multiple pipelines/instructions waiting on the prior instructions). The ExW value is just increased as needed. This represents a benefit over semaphore and other mechanisms.

While the above is a full description of the specific embodiments, various modifications, alternative constructions and equivalents may be used. As an example, the AI accelerator apparatus and chiplet devices can include any combination of elements described above, as well as outside of the present specification. Therefore, the above description and illustrations should not be taken as limiting the scope of the present invention which is defined by the appended claims.

What is claimed is:

1. An AI accelerator apparatus comprising:

a plurality of chiplets, each of the chiplets comprising:

a plurality of tiles, each of the tiles comprising a plurality of slices, a central processing unit (CPU) coupled to the plurality of slices, and a dispatch engine device coupled to the CPU, the dispatch engine device comprising:

a task fetch engine;

a plurality of task pipelines coupled to the task fetch engine, each of the task pipelines comprising:

a task queue, a plurality of tasks coupled to a task queue, and a task dispatch engine coupled to the plurality of tasks and configured to dispatch one or more of the plurality of tasks;

an instruction dispatch engine coupled to the task dispatch engine and configured to receive the one or more plurality of tasks of an instruction task type, and to dispatch one or more instructions to one or more compute units;

a memory device coupled to the instruction dispatch engine for storing the one or more instructions, the memory device comprising a plurality of SRAM cells;

an instruction fetch engine coupled to the memory device and configured to transfer one or more instructions from an external memory to the memory device;

a plurality of die-to-die (D2D) interconnects coupled to the each of CPUs in each of the tiles;

a peripheral component interconnect express (PCIe) bus coupled to the CPUs in each of the tiles, wherein the plurality of tasks further comprise a wait task type and an AI operation is contingent upon a task of the wait task type, the AI accelerator apparatus further comprising a scoreboard subsystem operably coupled to receive one or more tasks of the wait task type, the scoreboard system operably coupled to an external compute unit for receiving one or more completions; and the scoreboard system further comprising a plurality of scoreboard entries according to scoreboard entry identifiers (SIDs), each of which is configured to track at least one dependency involving one or more producers and one or more consumers, the scoreboard subsystem further comprising a Wait Content Addressable Memory (CAM) including entries comprising a number of expected waits for the SIDs, and a number of expected completions for the SIDs.

2. The AI accelerator apparatus of claim 1 wherein the memory device is an instruction memory device.

3. The AI accelerator apparatus of claim 1 wherein the wait task type indicates that the task dispatch engine is waiting upon at least one dependency involving one or more producers and one or more consumers.

4. The AI accelerator apparatus of claim 3 wherein the wait task type operates asynchronously and does not stall an instruction task queue.

5. The AI accelerator apparatus of claim 3 wherein the wait task type supports multiple wait counts for multi-consumer support.

6. The AI accelerator apparatus of claim 1 wherein the plurality of tasks further comprise a completion task type.

7. The AI accelerator apparatus of claim 6 wherein the completion task type indicates to the scoreboard that an action has completed and the at least one dependency should move closer to satisfied, without execution of a separate instruction.

8. The AI accelerator apparatus of claim 1 wherein the plurality of task pipelines monitor incoming completions and incoming completions are broadcast to the one or more tasks of the wait task type, wherein if all needed completions are received, a wait dependency is cleared.

9. The AI accelerator apparatus of claim 1 wherein the instruction dispatch engine is configured to implement dispatch pacing.

10. The AI accelerator apparatus of claim 1 wherein the tasks of the instruction task type can be of different sizes.

11. A dispatch engine integrated circuit device, the device comprising:

a task fetch engine;

a plurality of task pipelines coupled to the task fetch engine, each of the task pipelines comprising:

a task queue;

a plurality of tasks coupled to a task queue;

a task dispatch engine coupled to the plurality of tasks and configured to dispatch one or more of the plurality of tasks;

an instruction dispatch engine coupled to the task dispatch engine and configured to receive the one or more plurality of tasks of an instruction task type, and to dispatch one or more instructions to one or more compute units;

a memory device coupled to the instruction dispatch engine for storing the one or more instructions, the memory device comprising a plurality of SRAM cells;

an instruction fetch engine coupled to the memory device and configured to transfer one or more instructions from an external memory to the memory device, wherein the plurality of tasks further comprise a wait task type and an AI operation is contingent upon a task of the wait task type, the dispatch engine integrated circuit device further comprising a scoreboard subsystem operably coupled to receive one or more tasks of the wait task type, the scoreboard system operably coupled to an external compute unit for receiving one or more completions; and the scoreboard system further comprising a plurality of scoreboard entries according to scoreboard entry identifiers (SIDs), each of which is configured to track at least one dependency involving one or more producers and one or more consumers, the scoreboard subsystem further comprising a Wait Content Addressable Memory (CAM) including entries comprising a number of expected waits for the SIDs, and a number of expected completions for the SIDs.

12. The dispatch engine integrated circuit device of claim 11 wherein the memory device is an instruction memory device.

13. The dispatch engine integrated circuit device of claim 11 wherein the plurality of tasks further comprise a wait task type and an AI operation is contingent upon a task of the wait task type.

14. The dispatch engine integrated circuit device of claim 13 wherein the wait task type indicates that the task dispatch engine is waiting upon at least one dependency involving one or more producers and one or more consumers.

15. The dispatch engine integrated circuit device of claim 13 wherein the wait task type supports multiple wait counts for non-deterministic graph support.

16. The dispatch engine integrated circuit device of claim 11 wherein the plurality of tasks further comprises a completion task type.

17. The dispatch engine integrated circuit device of claim 16 wherein the completion task type indicates to the scoreboard that an action has completed and the at least one dependency should move closer to satisfied, without execution of a separate instruction.

* * * * *